(12) United States Patent
Schilling

(10) Patent No.: US 7,020,125 B2
(45) Date of Patent: *Mar. 28, 2006

(54) BROADBAND CDMA OVERLAY SYSTEM AND METHOD

(75) Inventor: Donald L. Schilling, Sands Point, NY (US)

(73) Assignee: InterDigital Technology Corporation, Wilmington, DE (US)

(*) Notice: Subject to any disclaimer, the term of this patent is extended or adjusted under 35 U.S.C. 154(b) by 974 days.

This patent is subject to a terminal disclaimer.

(21) Appl. No.: 09/878,586

(22) Filed: Jun. 11, 2001

(65) Prior Publication Data

US 2001/0033562 A1  Oct. 25, 2001

Related U.S. Application Data

(63) Continuation of application No. 09/400,715, filed on Sep. 21, 1999, now Pat. No. 6,389,002, which is a continuation of application No. 08/951,058, filed on Oct. 15, 1997, now Pat. No. 6,011,789, which is a continuation of application No. 08/329,371, filed on Apr. 7, 1994, now Pat. No. 5,703,874, which is a continuation of application No. 07/983,070, filed on Nov. 25, 1992, now abandoned, which is a continuation-in-part of application No. 07/622,235, filed on Dec. 5, 1990, now Pat. No. 5,351,269.

(51) Int. Cl.
*H04J 13/00* (2006.01)

(52) U.S. Cl. ..................... 370/342; 370/441

(58) Field of Classification Search ............ 370/310, 370/312, 313, 314, 320, 321, 324, 335, 336, 370/337, 342, 346, 347, 350; 375/131, 130, 375/145, 137; 455/38.3, 38.1, 422, 420; 380/34, 48; 379/214, 230, 231
See application file for complete search history.

(56) References Cited

U.S. PATENT DOCUMENTS

| | | | |
|---|---|---|---|
| 3,641,433 | A | 2/1972 | Mifflin et al. |
| 3,831,013 | A | 8/1974 | Alsup et al. |
| 3,900,721 | A | 8/1975 | Speiser et al. |
| 4,048,563 | A | 9/1977 | Osborne |
| 4,112,372 | A | 9/1978 | Holmes et al. |
| 4,222,115 | A | 9/1980 | Cooper et al. |
| 4,238,850 | A | 12/1980 | Vance |
| 4,247,942 | A | 1/1981 | Hauer |
| 4,270,207 | A | 5/1981 | Gutleber |
| 4,392,232 | A | 7/1983 | Andren et al. |
| 4,418,393 | A | 11/1983 | Zscheile, Jr. |
| 4,418,425 | A | 11/1983 | Fennel, Jr. et al. |
| 4,425,642 | A | 1/1984 | Moses et al. |

(Continued)

FOREIGN PATENT DOCUMENTS

EP  0265178  4/1988

(Continued)

OTHER PUBLICATIONS

S.O. Rice, Time-Series Analysis, Chap. 25, John Wiley & Schilling, Principles of Communication Systems, 2nd Edition, McGraw-Hill, New York, 1986.

(Continued)

*Primary Examiner*—Dang T. Ton
(74) *Attorney, Agent, or Firm*—Volpe and Koenig, P.C.

(57) ABSTRACT

A wireless communication system has spread spectrum and narrow band users. A selected base station produces a spread spectrum signal for transmission in a selected sector of the base station. The produced spread spectrum signal notch filters at frequencies. These frequencies are used by narrow band users located in the selected sector and sectors of base stations other than the selected base station adjacent tot he selected sector. The notch filtered signal is transmitted in the selected sector.

6 Claims, 16 Drawing Sheets

U.S. PATENT DOCUMENTS

| | | |
|---|---|---|
| 4,455,651 A | 6/1984 | Baran |
| 4,479,226 A | 10/1984 | Prabhu et al. |
| 4,512,013 A | 4/1985 | Nash et al. |
| 4,523,311 A | 6/1985 | Lee et al. |
| 4,553,130 A | 11/1985 | Kato |
| 4,563,774 A | 1/1986 | Gloge |
| 4,606,039 A | 8/1986 | Nicolas et al. |
| 4,612,637 A | 9/1986 | Davis et al. |
| 4,621,365 A | 11/1986 | Chiu |
| 4,647,863 A | 3/1987 | Skudera, Jr. et al. |
| 4,649,549 A | 3/1987 | Halpern et al. |
| 4,653,069 A | 3/1987 | Roeder |
| 4,660,164 A | 4/1987 | Leibowitz |
| 4,672,605 A | 6/1987 | Hustig et al. |
| 4,672,629 A | 6/1987 | Beier |
| 4,672,658 A | 6/1987 | Kavehrad et al. |
| 4,675,839 A | 6/1987 | Kerr |
| 4,680,785 A | 7/1987 | Akiyama et al. |
| 4,691,326 A | 9/1987 | Tsuchiya |
| 4,697,260 A | 9/1987 | Grauel et al. |
| 4,703,474 A | 10/1987 | Foschini et al. |
| 4,707,839 A | 11/1987 | Andren et al. |
| 4,718,080 A | 1/1988 | Serrano et al. |
| 4,730,340 A | 3/1988 | Frazier, Jr. |
| 4,742,512 A | 5/1988 | Akashi et al. |
| 4,759,034 A | 7/1988 | Nagazumi |
| 4,789,983 A | 12/1988 | Acampora et al. |
| 4,799,253 A | 1/1989 | Stern et al. |
| 4,805,208 A | 2/1989 | Schwartz |
| 4,807,222 A | 2/1989 | Amitay |
| 4,837,802 A | 6/1989 | Higashiyama et al. |
| 4,850,036 A | 7/1989 | Smith |
| 4,860,307 A | 8/1989 | Nakayama |
| 4,862,178 A | 8/1989 | Sturza et al. |
| 4,864,588 A | 9/1989 | Simpson et al. |
| 4,866,732 A | 9/1989 | Carey et al. |
| 4,894,842 A | 1/1990 | Broekhoven |
| 4,901,307 A | 2/1990 | Gilhousen et al. |
| 4,914,651 A | 4/1990 | Lusignan |
| 4,922,506 A | 5/1990 | McCallister et al. |
| 4,930,140 A | 5/1990 | Cripps et al. |
| 4,932,037 A | 6/1990 | Simpson et al. |
| 4,969,159 A | 11/1990 | Belcher et al. |
| 4,977,577 A | 12/1990 | Arthur et al. |
| 4,977,578 A | 12/1990 | Ishigaki et al. |
| 5,005,169 A | 4/1991 | Bronder et al. |
| 5,016,255 A | 5/1991 | Dixon et al. |
| 5,016,256 A | 5/1991 | Stewart |
| 5,022,047 A | 6/1991 | Dixon et al. |
| 5,023,887 A | 6/1991 | Takeuchi et al. |
| 5,029,180 A | 7/1991 | Cowart |
| 5,029,181 A | 7/1991 | Endo et al. |
| 5,036,523 A | 7/1991 | Briskman |
| 5,040,238 A | 8/1991 | Comroe et al. |
| 5,048,052 A | 9/1991 | Hamatsu et al. |
| 5,056,109 A | 10/1991 | Gilhousen et al. |
| 5,067,147 A | 11/1991 | Lee |
| 5,093,840 A | 3/1992 | Schilling |
| 5,179,571 A | 1/1993 | Schilling |
| 5,185,762 A | 2/1993 | Schilling |
| 5,189,683 A | 2/1993 | Cowart |
| 5,193,101 A | 3/1993 | McDonald et al. |
| 5,212,805 A | 5/1993 | Comroe et al. |
| 5,218,618 A | 6/1993 | Sagey |
| 5,228,053 A | 7/1993 | Miller et al. |
| 5,329,547 A | 7/1994 | Ling |
| 5,339,330 A | 8/1994 | Mallinckrodt |
| 5,351,269 A * | 9/1994 | Schilling ............... 370/335 |
| 5,703,874 A * | 12/1997 | Schilling ............... 370/335 |
| 6,011,789 A * | 1/2000 | Schilling ............... 370/342 |
| 6,389,002 B1 * | 5/2002 | Schilling ............... 370/342 |

FOREIGN PATENT DOCUMENTS

| | | |
|---|---|---|
| GB | 2173377 A | 10/1986 |
| WO | 8302533 | 7/1983 |

OTHER PUBLICATIONS

M.B. Pursley, "Performance Evaluation for Phase-Coded Spread-Spectrum Multiple-Access Communication—Part I: System Analysis", IEEE Transactions on Communications, Com-25, No. 8, Aug. 1977.

J.M. Holtzman, "A Simple, Accurate Method To Calculate Spread-Spectrum Multiple-Access Error Probabilities", IEEE Transactions on Communications, vol. 40, No. 3, Mar. 1992.

Fluhr, Z.C. and Porter, P.T., "Advanced Mobile Phone Service: Control Architecture", The Bell System Technical Journal (Jan. 1979), vol. 58, No. 1, pp. 43-69.

DeGaudenzi, R. and Viola, R., "A Novel Code Division Multiple Access System for High Capacity Mobile Communications Satellites", ESA Journal (1989), vol. 13, pp. 303-322.

Stiffler, J.J., Theory of Synchronous Communications (Prentice-Hall, Inc., New Jersey), table of contents listing.

Scholtz, Robert A., "The Origins of Spread-Spectrum Communications", IEEE Transactions on Communications (May 1982), vol. Com. 30, No. 5; pp. 822-855.

Nettleton, Raymond W., Spectral Efficiency in Cellular Land-Mobile Communications: A Spread-Spectrum Approach (1978) (unpublished Ph. D. Dissertation, Purdue University.

Cooper, George R. and Nettleton, Ray, W., "Cellular Mobile Technology: The Great Multiplier," IEEE Spectrum, Jun. 1983, pp. 30-37.

Blasbalg, H., "A Comparison of Pseudo-Noise and Conventional Modulation for Multiple-Access Satellite Communications," IBM Journal of Research Development, vol. 9, No. 4, Jul. 1965, pp. 241-255.

Dixon, Robert C., Spread Spectrum Systems (John Wiley & Sons, Inc.: New York, 3d ed. 1994), pp. 412-413.

The International Dictionary of Physics and Electronics (D. Van Nostrand Co.: Princeton, NJ, 2d ed. 1961), pp. 612, 952.

Robinson, Vester, Solid-State Circuit Analysis (Reston Publishing Co.: Reston, VA, 1975), pp. 309-314.

Alavi, Hossein, Power Control and Interference Management in a Spread-Spectrum Cellular Mobile Radio System (1984) (Unpublished Ph.D. Dissertation, Michigan State University).

M.S. Pursley, "Performance Evaluation for Phase-Coded Spread-Spectrum Multiple-Access Communication —Part 1: System Analysis", IEEE Transactions on Communications, Com-25, No. 8, Aug. 1997.

J.M. Holtzman, "A Simple Accurate Method To Calculate Spread Spectrum Multiple-Access Error Probabilities", IEEE Transactions on Communications, vol. 40, No. 3, Mar. 1992.

Frequenz, No. 9/10, Sep. 20, 1986, Berline De, pp. 255-259, Eizenhöfer 'Anwendung der Spread-Spectrum-Technik in dem hybriden Mobilfunksystem MATS-D'.

* cited by examiner

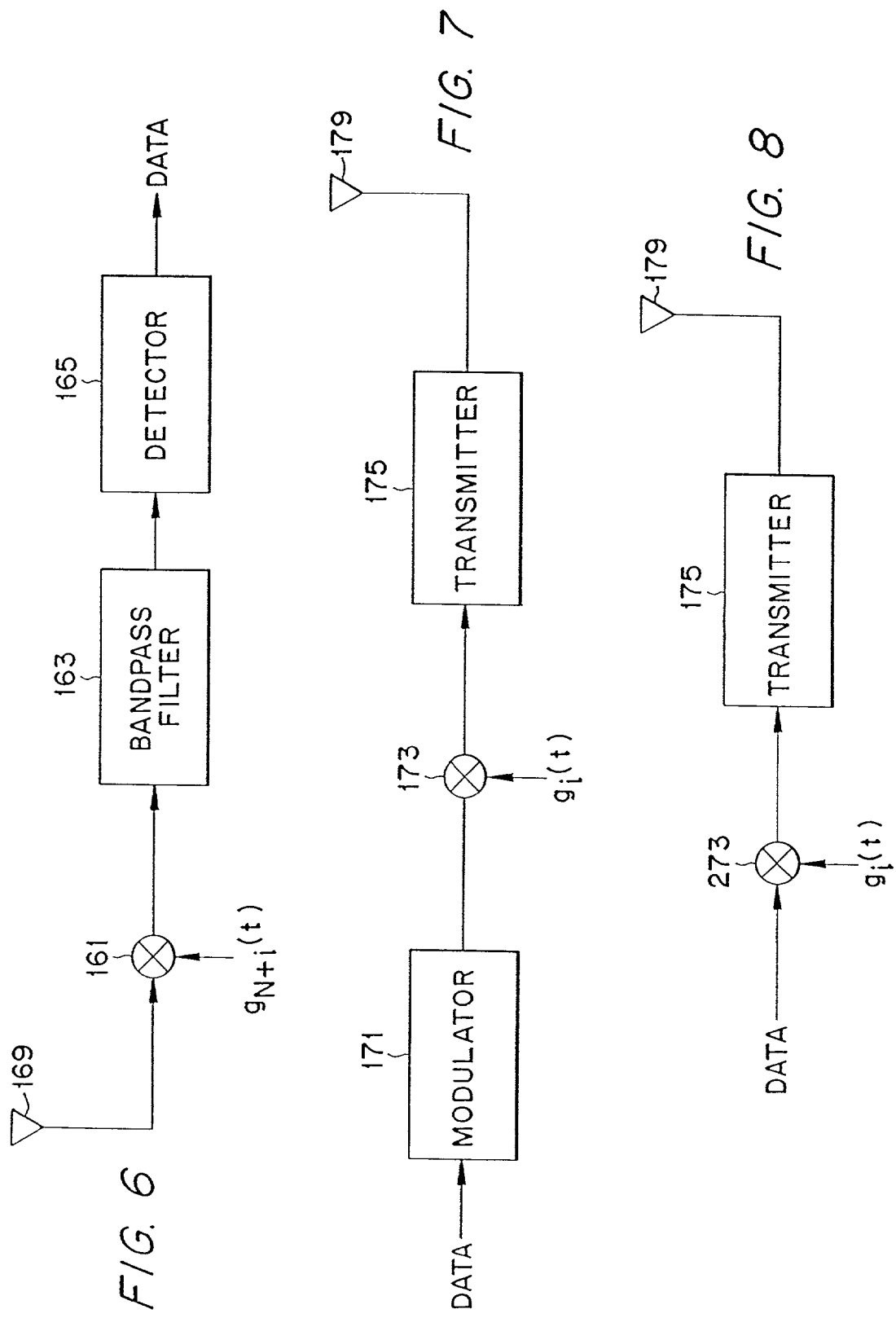

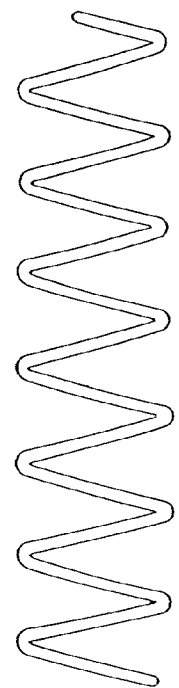
| N | $b_0 b_1 \ldots b_{N-1}$ |
|---|---|
| 3 | 011 |
| 4 | 0011 |
| 5 | 00101 |
| 6 | 000011 |
| 7 | 0000011 |
| 8 | 01110001 |
| 9 | 000010001 |
| 10 | 0000001001 |
| 11 | 00000000101 |
| 12 | 010000000111 |
| 13 | 1000000001111 |
| 14 | 01000000000111 |
| 15 | 000000000000011 |
FIG. 13
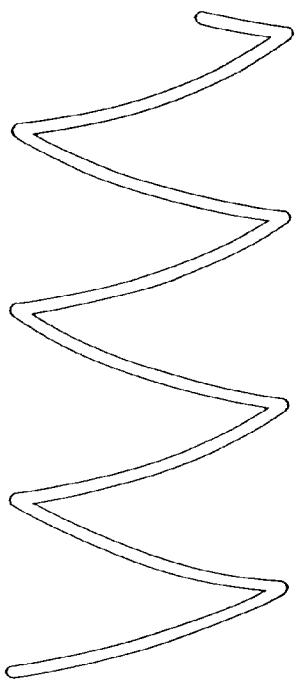
FIG. 10
FIG. 11

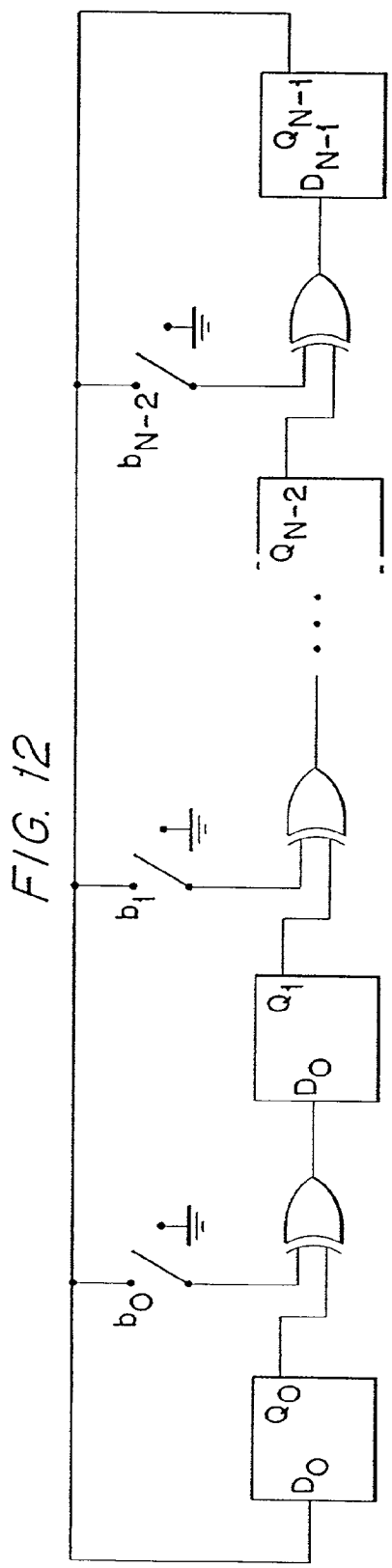
FIG. 12
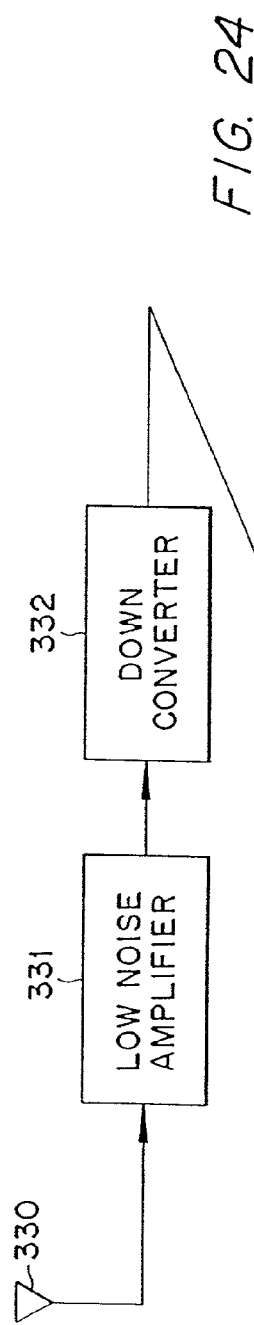
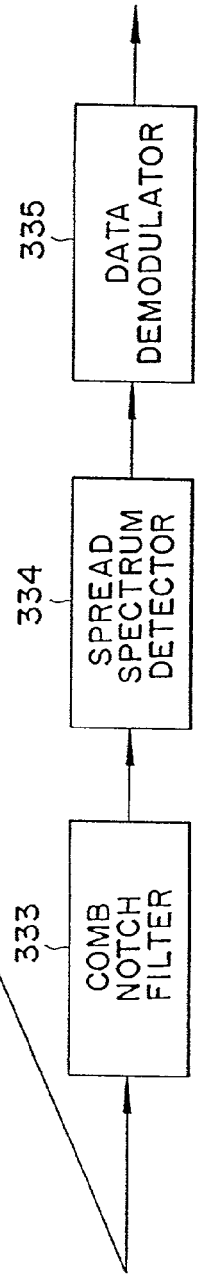
FIG. 24

BROADBAND CDMA OVERLAY SYSTEM AND METHOD

BROADBAND CDMA OVERLAY SYSTEM AND METHOD

This application is a continuation of application Ser. No. 09/400,715, filed Sep. 21, 1999, now U.S. Pat No. 6,389,002 which is a continuation of application Ser. No. 08/951,058, filed Oct. 15, 1997, now U.S. Pat. No. 6,011,789, which is a continuation of application Ser. No. 08/329,371, filed Apr. 7, 1994, now U.S. Pat. No. 5,703,874, which is a continuation of application Ser. No. 07/983,070, filed Nov. 25, 1992, now abandoned, which is a continuation-in-part of application Ser. No. 07/622,235, filed Dec. 5, 1990, now U.S. Pat. No. 5,351,269.

BACKGROUND

This invention relates to spread-spectrum communications and more particularly to a broadband code division multiple access communications system which communicates over the same frequency band of an existing frequency division multiple access (FDMA), proposed time division multiple access (TDMA) or any other mobile-cellular system.

DESCRIPTION OF THE RELEVANT ART

The current mobile-cellular system uses the frequency band 868–894 MHz for transmission from the mobile unit to the cellular base stations and the frequency band 823–849 MHz for transmission from the cellular base stations to the mobile unit. Each of these frequency bands is divided in half to permit two competitive systems to operate simultaneously. Thus, each system has 10.0 MHz available for transmission and 10.0 MHz for reception. Each of the 10.0 MHz bands is divided into 30 kHz channels for voice communications.

A problem in the prior art is limited capacity due to the number of channels available in the mobile radio cellular system.

FIG. 1 is a diagram of the cellular system. A mobile unit serviced by cell A located near the border of cells A and B and a mobile unit serviced by cell B located near the same border are received by the cellular base stations of cells A and B with almost the same power. To avoid interference between units operating in the same frequency band at comparable power levels, different frequency subbands, i.e. channels, are allocated to adjacent cells. FIG. 1 shows a seven frequency scheme, with each cell having a bandwidth equaling 10.0 MHz/7, which approximately equals 1.4 MHz. This frequency scheme has adjacent cells operating at different frequencies, thereby reducing interference among units in adjacent cells. This technique is called frequency reuse. As a result of frequency reuse, each cell has N=1.4 MHz/30 kHz=46 channels, with the channels divided and allocated as shown in FIG. 2. The 1.4 MHz is divided for FDMA or TDMA into 30 kHz channels for communications, each with a 180 kHz guard band. Each of the different cells, A through G, have channels that lie in a different 30 kHz band so that their spectra do not overlap. FIG. 2 also shows the spread-spectrum signal overlaying on the existing units whether they be Advanced Mobile Phone Service (AMPS) or IS54. Some of these channels are reserved for signaling, leaving approximately 41 channels per cell. The channels are allocated to cells A, B, and C as shown in FIG. 2. A guard band of 180 kHz separates each channel so that adjacent channel units within the same cell do not interfere with one another.

The cells in a mobile-cellular system are expensive to maintain, and profitability can be significantly increased by increasing the number of units per cell. One approach to increase the number of units per cell is to change from analog frequency modulation (FM) communication, and to use digital communication with time division multiple access.

Existing AMPS cellular systems exhibit numerous deficiencies; for example, lack of privacy, dropped calls, low data rate capabilities, poor quality speech, and limited capacity. TDMA and code division multiple access (CDMA) proposals attempt to overcome the capacity and privacy issues, with TDMA systems proposing to pack either 3 or 6 units in each 30 kHz frequency band previously used by the AMPS FM unit, while narrowband CDMA proposals, for example, by Qualcomm, claim a further increased capacity.

SUMMARY

A wireless communication system has spread spectrum and narrow band users. A selected base station produces a spread spectrum signal for transmission in a selected sector of the base station. The produced spread spectrum signal notch filters at frequencies. These frequencies are used by narrow band users located in the selected sector and sectors of base stations other than the selected base station adjacent tot he selected sector. The notch filtered signal is transmitted in the selected sector.

BRIEF DESCRIPTION OF THE DRAWING(S)

The accompanying drawings, which are incorporated in and constitute a part of the specification, illustrate preferred embodiments of the invention, and together with the description serve to explain the principles of the invention.

FIG. 6 is a block diagram of a unit-spread-spectrum receiver;

FIG. 7 is a block diagram of a first embodiment of unit-spread-spectrum transmitter;

FIG. 8 is a block diagram of a second embodiment of a unit-spread-spectrum transmitter;

FIG. 10 shows a spread-spectrum data signal when the spread-spectrum signal power is equal to an AM signal power;

FIG. 11 shows an audio signal when the spread-spectrum signal power is equal to the AM signal power;

FIG. 12 shows a pseudo-random sequence generator;

FIG. 13 shows position settings of switches of FIG. 12 to form PN sequences;

Figure 15:
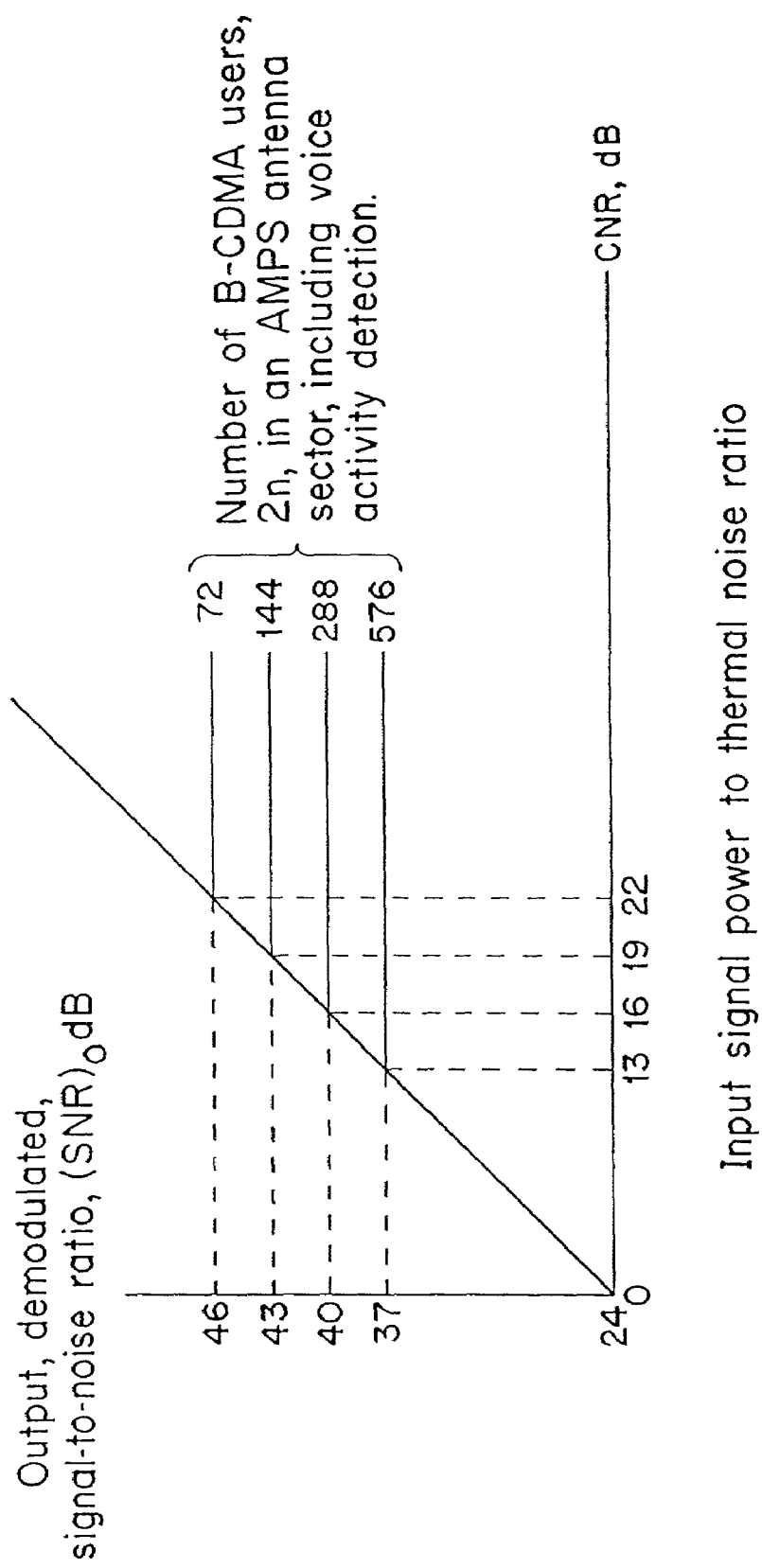
Figure 16:
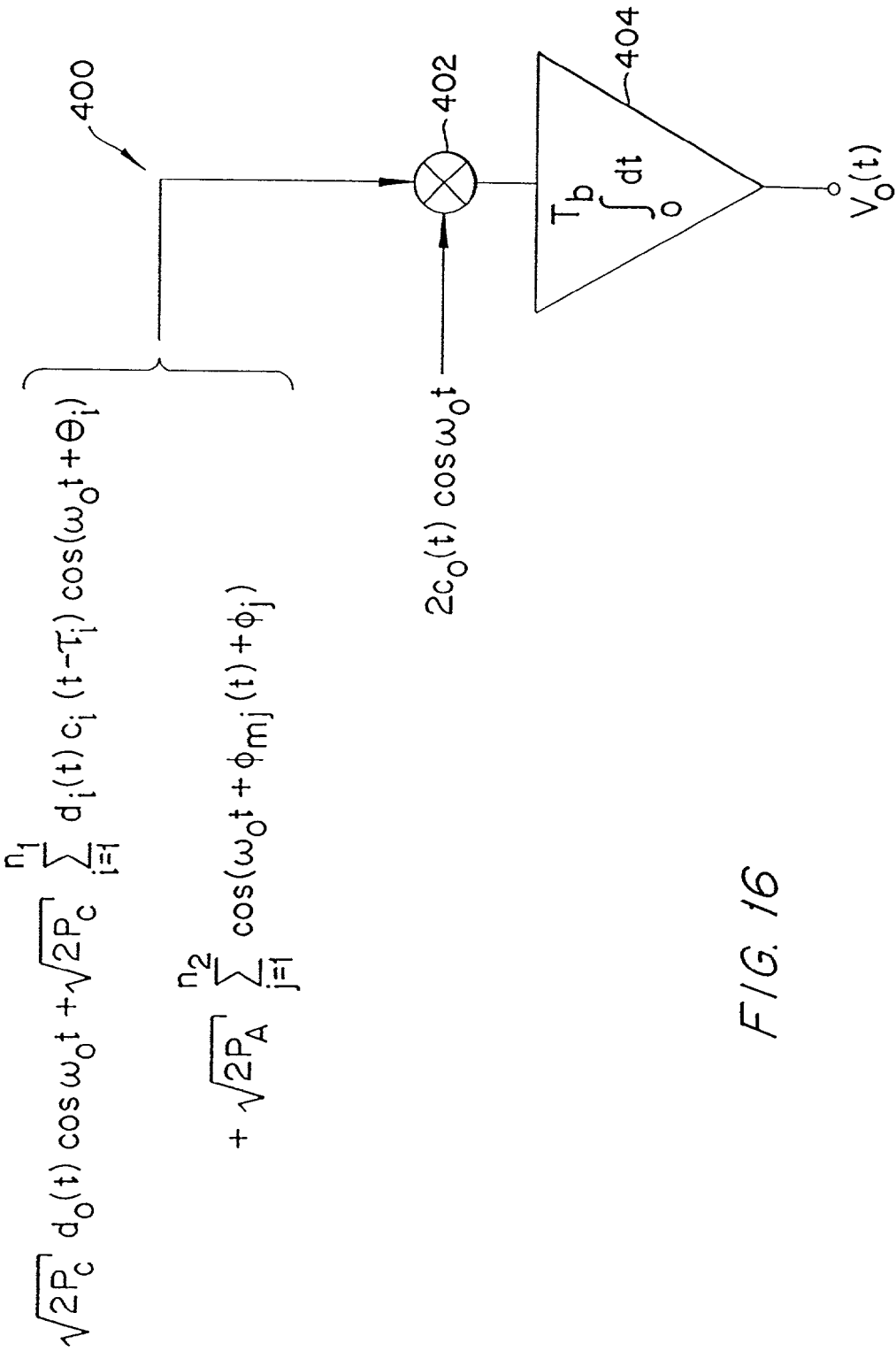
Figure 17:
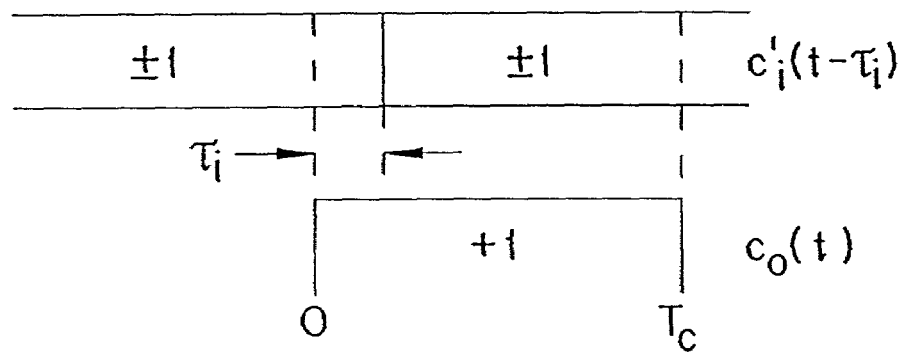
Figure 18:
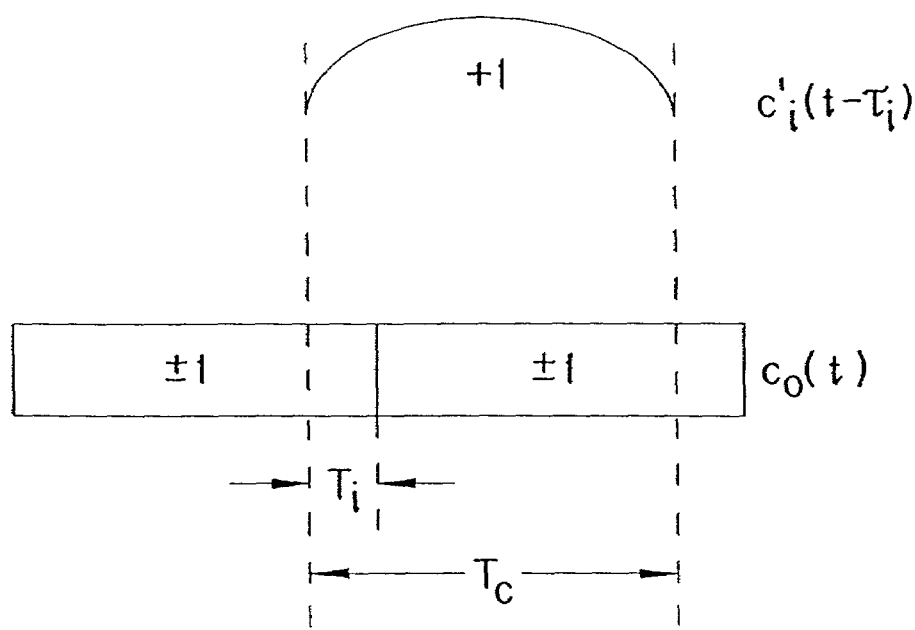
Figure 19:
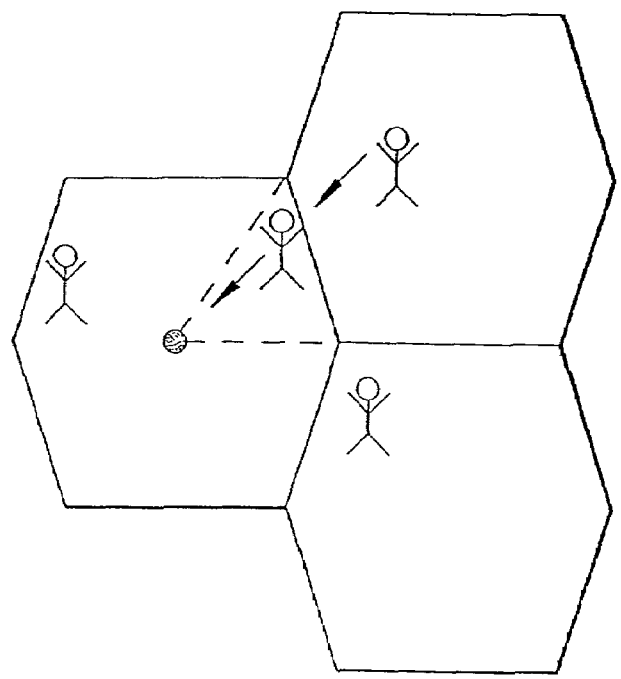
Figure 20:
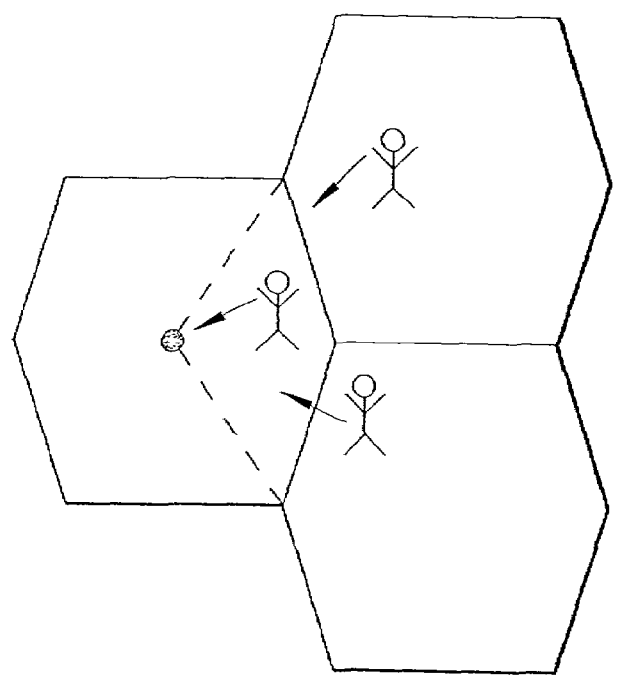
Figure 21:
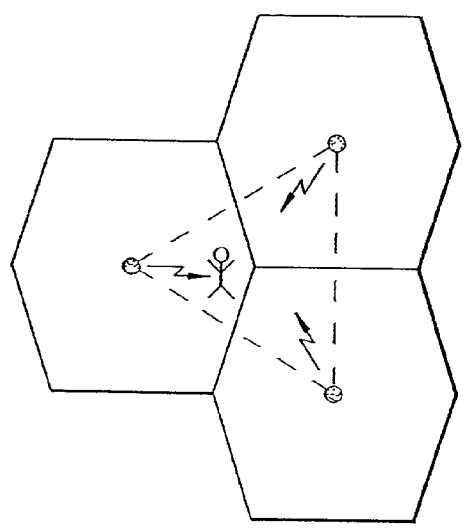
Figure 22:
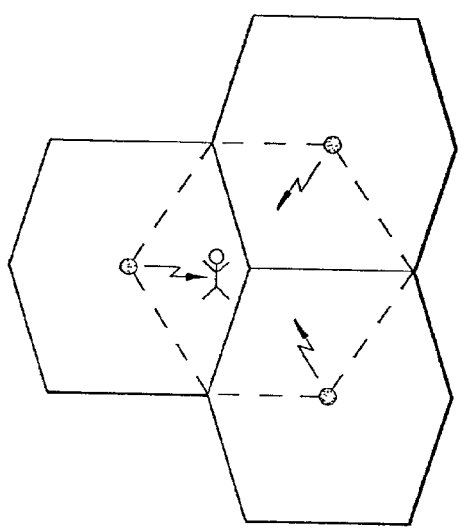
Figure 23:
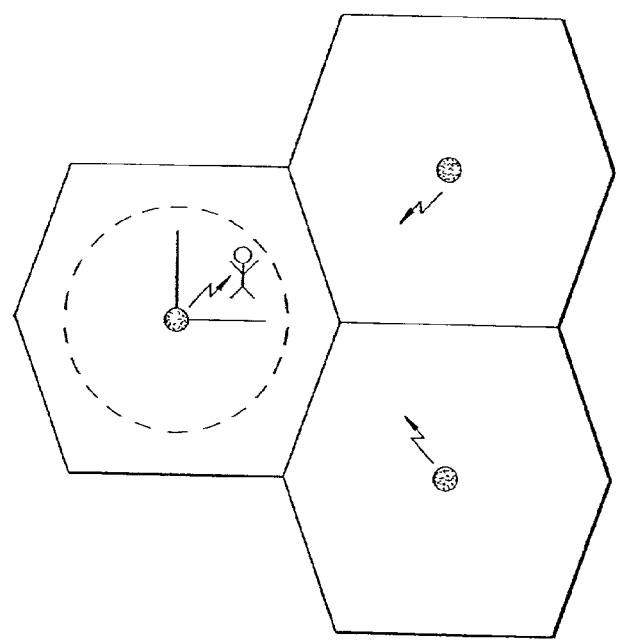
Figure 25:
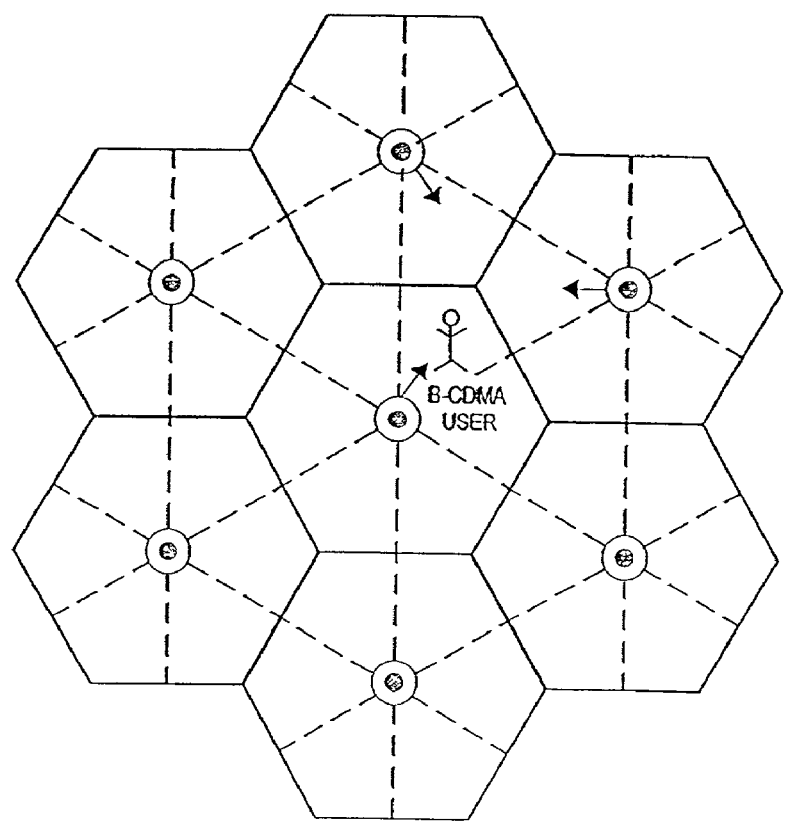

FIG. 15 plots output signal-to-noise ratios for different numbers of CDMA units in an AMPS antenna sector;

FIG. 16 illustrates a coherent demodulator for performing a demodulation procedure;

FIG. 17 shows rectangular pulses $c_o$ and $c'_i$;

FIG. 18 shows a half-sine wave pulse $c'_i(t)=\sin[\pi t/(Tc)]$ and a rectangular pulse $c_o(t)$;

FIG. 19 illustrates the effect of AMPS units on a B-CDMA base station;

FIG. 20 illustrates the effect of B-CDMA units on an AMPS base station;

FIG. 21 illustrates the effect of B-CDMA base stations on CDMA units;

FIG. 22 illustrates the effect of AMPS base stations on CDMA units;

FIG. 23 shows the effect of the CDMA base stations on AMPS units;

FIG. 24 illustrates the use of a comb filter;

FIG. 25 shows a cellular system employing 6-segment antennas; and

Figure 26:
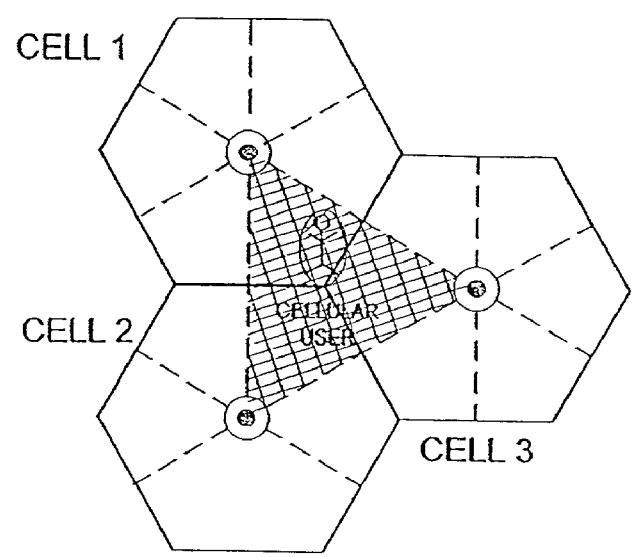

FIG. 26 illustrates a region having a notching-out of power.

DETAILED DESCRIPTION OF THE PREFERRED EMBODIMENT(S)

Reference is now made in detail to the present preferred embodiments of the invention, examples of which are illustrated in the accompanying drawings, wherein like reference numerals indicate like elements throughout the several views.

The spread-spectrum code division multiple access (CDMA) communications system of the present invention is located within a same geographical region, i.e. cell, as occupied by a mobile-cellular system. Each cell of the mobile-cellular system has a cellular bandwidth. In presently deployed mobile-cellular systems, the cellular bandwidth is approximately 10.0 MHz. The cellular bandwidth is divided into a plurality of predetermined channels. Each predetermined channel typically has a bandwidth of 30 kHz. The predetermined channels are separated by guard bands. The usual guard band separation is 180 kHz. Cellular units communicate on the predetermined channels, currently using frequency modulation (FM).

The spread-spectrum CDMA communications system includes a plurality of spread-spectrum-base stations and a plurality of spread-spectrum units located within the same geographical region, i.e. cell, as occupied by the mobile-cellular system. The spread-spectrum CDMA communications system can be used for communicating data between a plurality of spread-spectrum units and the spread-spectrum-base station. The data may be, but are not limited to, computer data, facsimile data or digitized voice.

A spread-spectrum-base station, which preferably is collocated geographically with a cellular-base station, communicates data between the plurality of spread-spectrum units, with a first spread-spectrum user uses a first spread-spectrum unit, and a second spread-spectrum user uses a second spread-spectrum unit, etc.

Each spread-spectrum-base station includes at least one set of base-converting means, base-spread-spectrum-processing means, base-transmitting means, base-detection means and a base antenna. Each spread-spectrum base station additionally includes base-comb-filter means and/or base-sector means. The term "base" is used as a prefix to indicate that a respective element is located at the spread-spectrum-base station.

The base-comb-filter means may include notch filters which attenuate the mobile-cellular signal power transmitted on predetermined channels of the mobile-cellular system. The base-detection means may include base-despreading means and base-synchronizing means. The base-detection means broadly converts data communicated from a spread-spectrum unit into a form for output to a user. The base-despreading means broadly despreads a received spread-spectrum signal.

Figure 3:
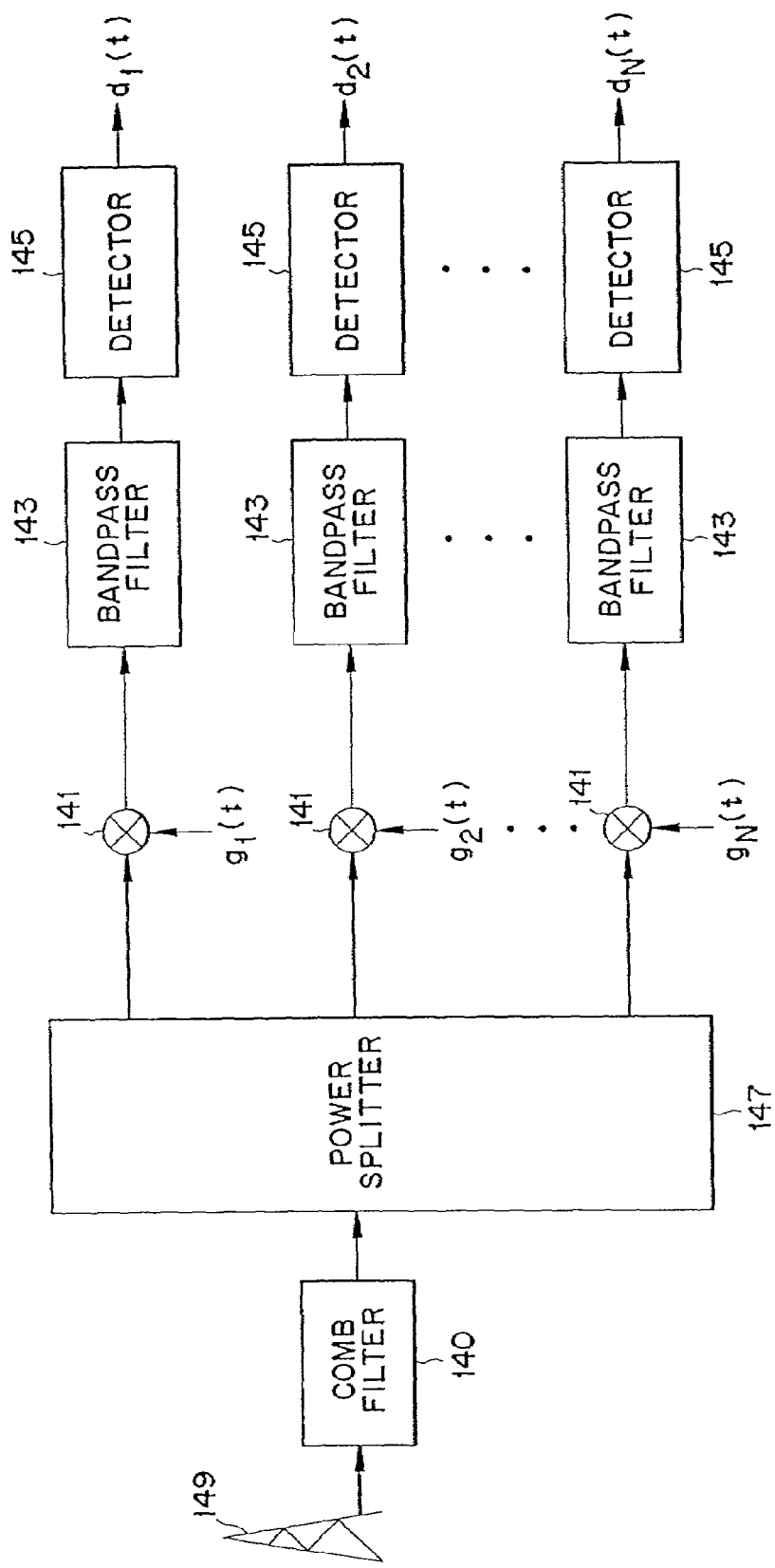
FIG. 3 is a block diagram of a spread-spectrum-base station receiver.

The base-comb-filter means, as shown in FIG. 3, may be embodied as a comb filter 140. The comb filter 140 notches the predetermined channels of the mobile-cellular system. The comb filter 140 reduces the combined interfering power level from mobile-cellular units with the spread-spectrum-base station. For the presently deployed mobile-cellular system, by way of example, the comb filter 140 serves as a plurality of notch filters, blocking the 30 kHz bandwidth at each frequency location of the predetermined channels of the mobile-cellular system.

The base-despreading means, as illustrated in FIG. 3, may be embodied as a pseudorandom generator, a plurality of product devices 141 and a plurality of bandpass filters 143. The pseudorandom generator stores chip codes, $g_1(t)$, $g_2(t)$, . . . , $g_N(t)$, for demodulating data from spread-spectrum signals received from the plurality of spread-spectrum units at the spread-spectrum-base station. The base-detection means also includes base-synchronizing means for synchronizing the base-despreading means to received spread-spectrum signals. The base-synchronizing means may be embodied as a phase-locked-loop circuit.

Alternatively, the base-despreading means may be embodied as a plurality of matched filters. The plurality of matched filters may employ surface-acoustic-wave (SAW) devices, digital signal processors, or a combination of analog and digital technologies, as is well known in the art. Each matched filter has an impulse response matched to each chip code $g_1(t)$, $g_2(t)$, . . . , $g_N(t)$, respectively, for demodulating data from the spread-spectrum signals received from the plurality of spread-spectrum units. The impulse responses of the matched filters may be either fixed or programmable.

The spread-spectrum receiver at the spread-spectrum-base station processes selected data received from a selected spread-spectrum unit, which were transmitted with a spread-spectrum signal using a selected-chip-code, $g_i(t)$. The detector 145 demodulates the selected data from the despread spread-spectrum signal.

A plurality of product devices 141, bandpass filters 143 and detectors 145 may be coupled through a power splitter 147 to an antenna 149, for receiving simultaneously multiple spread-spectrum channels. Each product device 141 uses a selected chip code for demodulating a selected spread-spectrum signal, respectively.

For a spread-spectrum system to operate properly, the spread-spectrum receiver must acquire the correct phase position of the received spread spectral signal, and the spread-spectrum receiver must continually track that phase position so that loss-of-lock does not occur. The two processes of acquisition and tracking form the synchronization subsystem of the spread-spectrum receiver. The former operation typically is accomplished by a search of as many phase positions as necessary until one phase position is found which results in a large correlation between the phase of the incoming signal and the phase of the locally generated spreading sequence at the receiver. This former process typically occurs using a correlator or a matched filter. The latter operation is often performed with a delay-locked loop.

The importance of the combined synchronization process can not be over stated for if synchronization is not both achieved and maintained, the desired signal cannot be despread.

Figure 4:
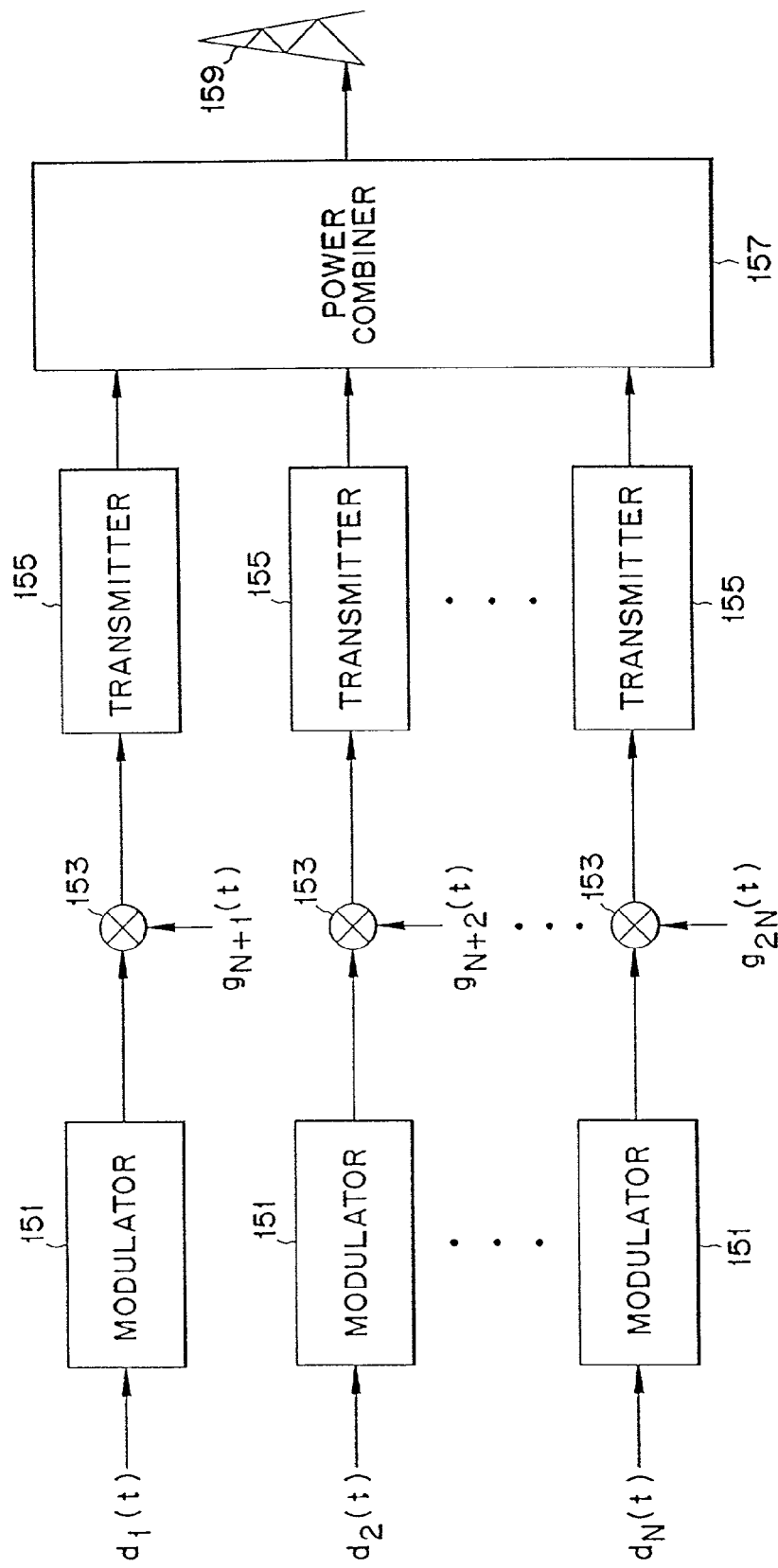
FIG. 4 is a block diagram of a first embodiment of a spread-spectrum-base station transmitter.

The base-converting means, as illustrated in FIG. 4, may be embodied as a base modulator 151. Each base modulator 151 converts the format of data to be transmitted to a spread-spectrum unit into a form for communicating over radio waves. For example, an analog voice signal may be converted to a base-data signal, using a technique called source encoding. Typical source coders are linear predictive coders, vocoders, delta modulators and pulse code modulation coders.

The base-spread-spectrum-processing means may be embodied as a base-spread-spectrum modulator 153. Each base-spread-spectrum modulator 153 is coupled to a respective base modulator 151. Each base-spread-spectrum modulator 153 modulates the converted-data signal using spread-spectrum. The converted data is multiplied using a product device, or is modulo-2 added, using an EXCLUSIVE-OR gate 153, with a selected spread-spectrum chip code, $g_n+i(t)$.

The base-transmitter means may be embodied as a base transmitter 155. Each base transmitter 155 is coupled to a respective base-spread-spectrum modulator 153. Each base transmitter 155 transmits, across the cellular bandwidth, the spread-spectrum-processed-converted data from the spread-spectrum-base station to a spread-spectrum unit. Each base transmitter 155 also modulates the spread-spectrum-processed-converted data at a carrier frequency, $f_o$.

Each base transmitter 155 has a transmitter oscillator which supplies a carrier signal having a carrier frequency. The transmitter oscillator is coupled to a transmitter-product device. The base transmitter 155 multiplies, using the transmitter-product device, the spread-spectrum-processed-converted data by the carrier signal.

The base-transmitting means may, in a preferred embodiment, transmit data using a spread-spectrum signal having a power level limited to a predetermined level. The base-transmitting means may also transmit data by adding the plurality of spread-spectrum data signals.

A plurality of base modulators 151, base product devices 153 and base transmitters 155 may be coupled through a power combiner 157 to an antenna 159 for simultaneously transmitting a multiplicity of spread-spectrum channels. FIG. 4 is an illustrative embodiment for generating simultaneous spread-spectrum signals, and there are many variants for interconnecting product devices, modulators and transmitters, for accomplishing the same function.

Figure 5:
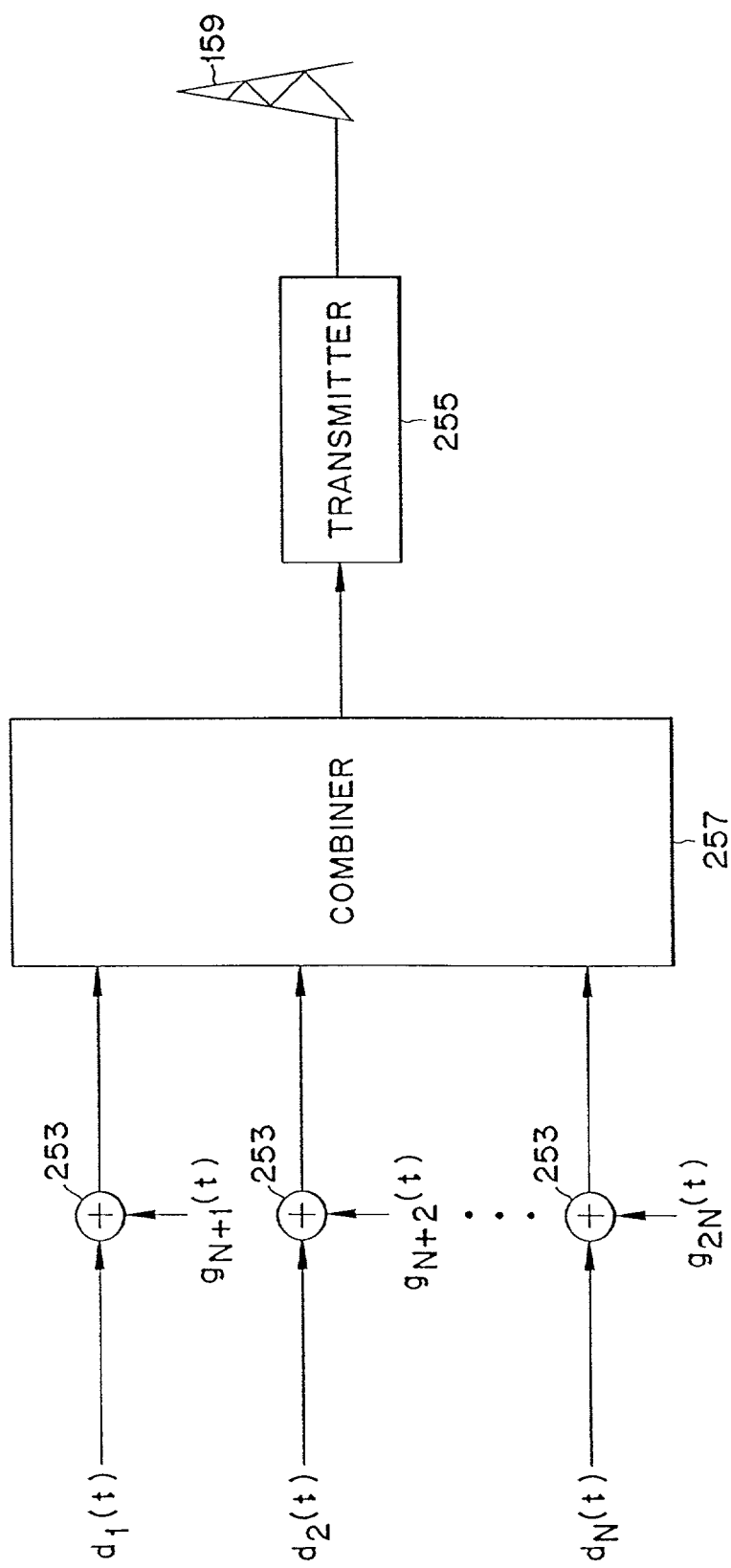
FIG. 5 is a block diagram of a second embodiment of a spread-spectrum-base station transmitter.

As an alternative example, FIG. 5 illustrates a spread-spectrum-base station transmitter which may be used for producing the same result as the transmitter of FIG. 4. The base-spread-spectrum modulator at the spread-spectrum-base station includes means for processing data for particular spread-spectrum units with a selected chip code. In FIG. 5, the base-spread-spectrum-processing means may be embodied as EXCLUSIVE-OR gates 253, with the data being modulo-2 added, using EXCLUSIVE-OR gates 253, with a selected spread-spectrum chip code, $g_N+i(t)$. The resulting spread-spectrum processed data from a plurality of EXCLUSIVE-OR gates 253 are combined using combiner 257. The base transmitter 255 modulates the combined spread-spectrum-processed data at the carrier frequency, $f_o$. The base transmitter 255 is coupled to the antenna 159 and simultaneously transmits the plurality of spread-spectrum-processed data as a spread-spectrum signal having a multiplicity of spread-spectrum channels.

One or more spread-spectrum-base stations may include base-sector means. The base sector means includes the control circuits and base antennas for dividing a geographical coverage area of the spread-spectrum-base station into two, three, four, five, six, or more sectors. The geographical coverage area, by way of example, may be divided into three sectors of 120°, by using three antennas with appropriate beamwidths. Each antenna is coupled to separate sets of base-converting means, base-spread-spectrum-processing means, base-transmitting means, and base-detection means. The control circuits include the capability for handing-off a spread-spectrum unit traversing from a first sector to a second sector of the spread-spectrum-base station. Circuits for performing this hand-off are described in U.S. patent application by Donald L. Schilling, entitled SPREAD SPECTRUM CELLULAR HANDOFF APPARATUS AND METHOD, having Ser. No. 07/727,617, filing date of Jul. 10, 1991, and now issued U.S. Pat. No. 5,179,571, and incorporated herein by reference. The sector means allows lower power levels to be transmitted from the spread-spectrum-base station, by focusing the required power into the sector in which the spread-spectrum unit is located. This sectoring of the geographical area reduces the combined interfering power level from the mobile-cellular units with the spread-spectrum-base station.

The present invention also includes spread-spectrum units which are located within the cell. Each of the spread-spectrum units has a unit antenna, unit-spread-spectrum-detection means, unit-converting means, unit-spread-spectrum-processing means, and unit-transmitting means. The unit-detection means is coupled to the unit antenna. The unit-detection means includes unit-despreading means. The term "unit" is used as a prefix to indicate that a respective element is located at a spread-spectrum unit.

The unit-detection means recovers data communicated to the spread-spectrum unit from the spread-spectrum-base station. The unit-detection means also includes means for converting the format of the data into a form suitable for output to a user. The format may be, for example, computer data, an analog speech signal or other information. The unit-detection means, by way of example, may include tracking and acquisition circuits for the spread-spectrum signal, a product device for despreading the spread-spectrum signal, and an envelope detector. FIG. 6 illustratively shows unit-detection means embodied as a unit-spread-spectrum receiver including a unit-spread-spectrum demodulator 161, a unit-bandpass filter 163, and a unit-data detector 165, coupled to an antenna 169.

The unit-spread-spectrum demodulator 161 despreads using a chip-code signal having the same or selected chip code, $g_N+i(t)$, as the received spread-spectrum signal, the spread-spectrum signal received from the spread-spectrum-base station. The unit-bandpass filter 163 filters the despread signal and the unit-data detector 165 puts the format of the despread spread-spectrum signal into a form suitable for output to a user of the spread-spectrum unit.

The unit-despreading means includes means for storing a local chip code, $g_N+i(t)$, for comparing the local chip code to signals received for recovering data sent from the spread-spectrum-base station to the spread-spectrum unit. The storing means may be embodied as a memory.

The unit-detection means also may include unit-synchronizing means for synchronizing the unit-despreading means to received signals. The unit-synchronizing means may be embodied as a phase-lock loop circuit. Similarly, the base-despreading means at the spread-spectrum-base station includes means for processing data for particular spread-spectrum units with a selected chip code. The unit-despreading means may be embodied as EXCLUSIVE-OR gates for modulo-2 adding the data with a selected spread-spectrum chip code.

Alternatively, the unit-despreading means may be embodied as a matched filter. The matched filter may employ a surface-acoustic-wave (SAW) device, a digital signal processor, or a combination of analog and digital technologies, as is well known in the art. Each matched filter has an impulse response matched to each chip code $g_1(t), g_2(t), \ldots, g_N(t)$, respectively, for demodulating data from the spread-spectrum signals received from the base station. The impulse responses of the matched filters may be either fixed or programmable.

The unit-converting means, as illustrated in FIG. 7, may be embodied as a unit modulator 171. The unit modulator 171 converts the format of the data into a form suitable for communicating over radio waves. Similar to the spread-spectrum-base station, an analog voice signal may be converted to a converted-data signal, using a technique called source encoding. As with the base modulator 151, typical source encoders are linear predictive coders, vocoders, delta modulators and pulse code modulation.

The unit-spread-spectrum-processing means may be embodied as a unit-spread-spectrum modulator 173. The unit-spread-spectrum modulator 173 is coupled to the unit modulator 171. The unit-spread-spectrum modulator 173 modulates the converted-data signal with a selected chip code, $g_i(t)$. The converted-data signal is multiplied using a product device, or is modulo-2 added, using an EXCLUSIVE-OR gate, with the selected chip code, $g_i(t)$.

The unit-transmitting means in FIGS. 7 and 8 may be embodied as a unit transmitter 175. The unit transmitter 175 transmits across the cellular bandwidth, the spread-spectrum-processed-converted data from the spread-spectrum unit to the spread-spectrum-base station. The unit transmitter 175 modulates the spread-spectrum-processed-converted data at a carrier frequency, $f_o$. The carrier frequency of the unit transmitter and the base transmitter may be at the same or different frequencies.

As an equivalent transmitter, FIG. 8 illustrates a transmitter for a spread-spectrum unit having unit-spread-spectrum-processing means as a modulo-2 adder, embodied as an EXCLUSIVE-OR gate 273. The EXCLUSIVE-OR gate 273 modulo-2 adds the converted data signal with the selected chip code, $g_i(t)$.

Each of the embodiments of the unit-spread-spectrum transmitter in FIGS. 7 and 8 may include a unit transmitter 175. The unit transmitter 175 is coupled between the unit-spread-spectrum modulator 173 and unit antenna 179, as in FIG. 7, or, in the alternate embodiment, the unit transmitter 175 is coupled between the EXCLUSIVE-OR gate 273 and the unit antenna 179. The unit transmitter 175 transmits across the cellular bandwidth, the spread-spectrum-processed-converted data from the spread-spectrum unit to the spread-spectrum-base station.

A key to the present invention is that the spread-spectrum signals are designed to be transparent to other units, i.e. spread-spectrum signals are designed for negligible interference to the communication of other, existing units. The presence of a spread-spectrum signal is difficult to determine. This characteristic is known as low probability of interception (LPI) and low probability of detection (LPD). The LPI and LPD features of spread-spectrum allow transmission between units of a spread-spectrum CDMA communications system without the existing units of the mobile-cellular system experiencing significant interference. The present invention makes use of LPI and LPD with respect of the predetermined channels using FM in a mobile-cellular system. By having the power level of each spread-spectrum signal below the predetermined level, the total power from all spread-spectrum used within a cell does not interfere with units in the mobile-cellular system.

In addition, spread-spectrum is also jam or interference resistant. A spread-spectrum receiver spreads the spectrum of the interfering signal. This reduces the interference from the interfering signal so that it does not noticeably degrade performance of the spread-spectrum system. This feature of interference reduction makes spread-spectrum useful for commercial communications, i.e. the spread-spectrum waveforms can be overlaid on top of existing narrowband signals.

The present invention employs direct sequence spread-spectrum, which uses a phase modulation technique. Direct sequence spread-spectrum takes the power that is to be transmitted and spreads it over a very wide bandwidth so that the power per unit bandwidth (Watts/Hertz) is minimized. When this is accomplished, the transmitted spread-spectrum power received by a mobile-cellular unit, having a relatively narrow bandwidth, is only a small fraction of the actual transmitted power.

In a mobile-cellular system, by way of example, if a spread-spectrum signal having a power of 10 mw is spread over a cellular bandwidth of 10.0 MHz and a cellular unit employs a communication system having a channel bandwidth of only 30 kHz, then the effective interfering power due to one spread-spectrum signal, in the narrow band communication system, is reduced by the factor of 10.0 MHz/30 kHz which is approximately 330. Thus, the effective interfering power is 10 mW divided by 330 or 0.030 mW. For fifty concurrent units of spread-spectrum, the power of the interfering signal due to spread-spectrum is increased by fifty to a peak interfering power of 1.00 mW.

The feature of spread-spectrum that results in interference reduction is that the spread-spectrum receiver actually spreads the received energy of any interferer over the same wide bandwidth, 10.0 MHz in the present example, while compressing the bandwidth of the desired received signal to its original bandwidth. For example, if the original bandwidth of the desired spread-spectrum data signal is only 30 kHz, then the power of the interfering signal produced by the cellular base station is reduced by 10.0 MHz/30 kHz which is approximately 330.

Direct sequence spread-spectrum achieves a spreading of the spectrum by modulating the original signal with a very wideband signal relative to the data bandwidth. This wideband signal is chosen to have two possible amplitudes, +1 and −1, and these amplitudes are switched, in a pseudo-random manner, periodically. Thus, at each equally spaced time interval, a decision is made as to whether the wideband modulating signal should be +1 or −1. If a coin were tossed to make such a decision, the resulting sequence is truly random. However, in such a case, the receiver is does not know the sequence beforehand and could not properly receive the transmission. Instead, a chip-code generator generates electronically an approximately random sequence, called a pseudo-random sequence, which is known beforehand to both the transmitter and the receiver.

To illustrate the characteristics of spread-spectrum, consider 4800 bps data which are binary phase-shift keyed (BPSK) modulated. The resulting signal bandwidth is approximately 9.6 kHz. This bandwidth is then spread using direct sequence spread-spectrum to 16 MHz. Thus, the processing gain, N, is approximately 1600 or 32 dB.

Alternatively, consider a more typical implementation with 4800 bps data which is modulo-2 added to a spread-spectrum-chip-code signal, $g_i(t)$, having a chip rate of 8 Mchips/sec. The resulting spread-spectrum data are binary phase-shift keyed (BPSK) modulated. The resulting spread-spectrum bandwidth is 16 MHz. Thus, the processing gain is: $N=(8\times10^6)/(4.8\times10^3)$, which approximately equals 1600, or 32 dB.

Figure 9:
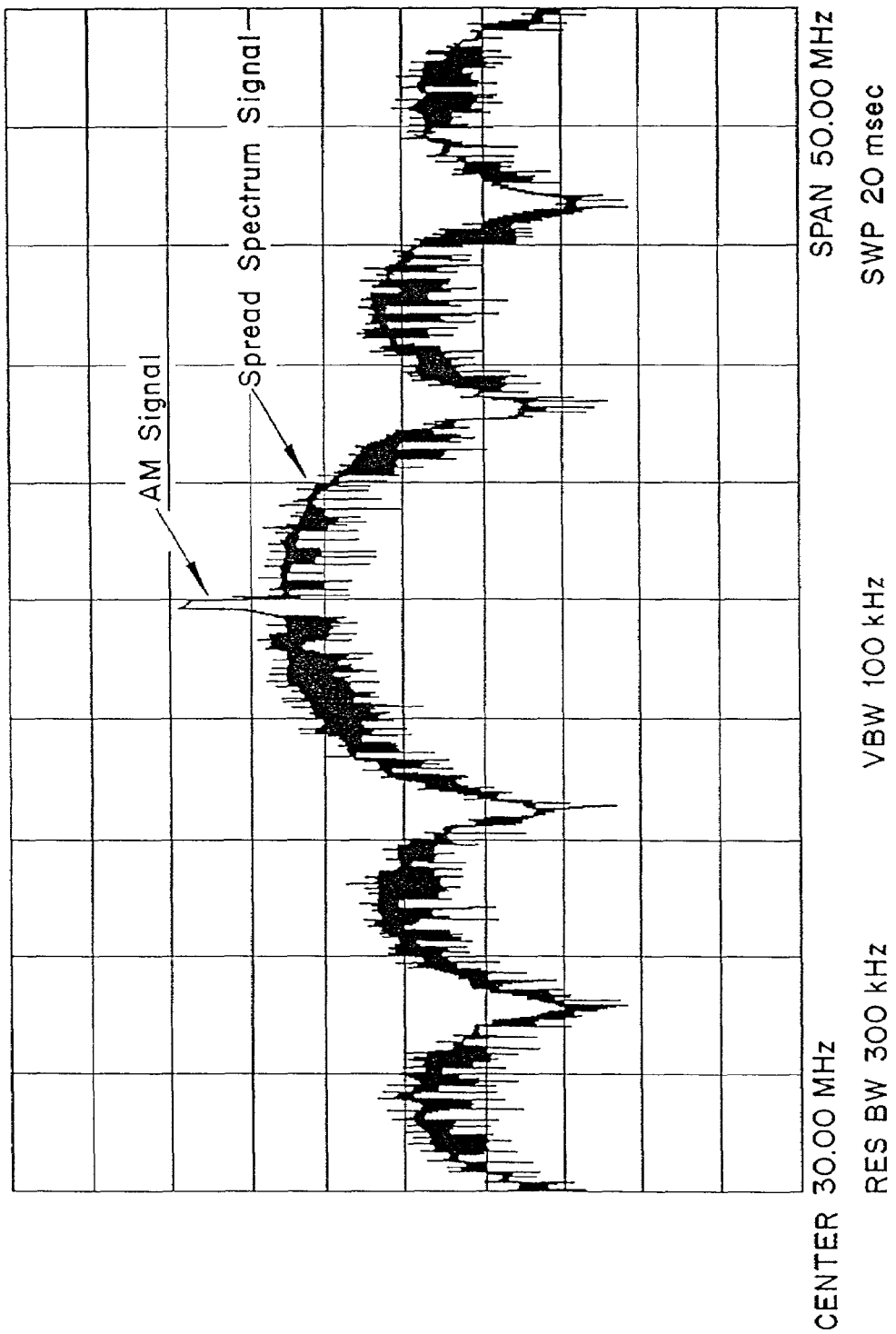
FIG. 9 shows the spectrum of a spread-spectrum signal with an AM signal of equal power at its carrier frequency.

FIG. 9 shows the spectrum of this spread-spectrum signal on an amplitude modulated 3 kHz sinusoidal signal, when they each have the same power level. The bandwidth of the AM waveform is 6 kHz. Both waveforms have the same carrier frequency.

FIG. 10 shows the demodulated square-wave data stream. This waveform has been processed by an integrator in the receiver, hence the triangular shaped waveform. Note that positive and negative peak voltages representing a 1-bit and 0-bit are clearly shown. FIG. 11 shows that the demodulated AM signal replicates the 3 kHz sine wave.

The AM signal does not degrade the reception of data because the spread-spectrum receiver spreads the energy of the AM signal over 16 MHz, while compressing the spread-spectrum signal back to its original 9.6 kHz bandwidth. The amount of the spread AM energy in the 9.6 kHz BPSK bandwidth is the original energy divided by N=1600; or, equivalently, it is reduced by 32 dB. Since both waveforms initially were of equal power, the signal-to-noise ratio is now 32 dB, which is sufficient to obtain a very low error rate.

The spread-spectrum signal does not interfere with the AM waveform because the spread-spectrum power in the bandwidth of the AM signal is the original power in the spread-spectrum signal divided by $N_1$, where $N_1=16$ MHz/6 kHz=2670, or 33 dB; hence, the signal-to-interference ratio of the demodulated sine wave is 33 dB.

The direct sequence modes of spread-spectrum uses pseudo random sequences to generate the spreading sequence. While there are many different possible sequences, the most commonly used are maximal-length linear shift register sequences, often referred to as pseudo noise (PN) sequences. FIG. 12 shows a typical shift register sequence generator. FIG. 13 indicates the position of each switch $b_i$ to form a PN sequence of length L, where $$L=2^N-1$$

The characteristics of these sequences are indeed noise like. To see this, if the spreading sequence is properly designed, the spreading sequence has many of the randomness properties of a fair coin toss experiment where 1=heads and −1=tails. These properties include the following:
1) In a long sequence, about ½ of the chips are +1 and ½ of the chips are −1.
2) The length of a run of r chips of the same sign occurs about $L/2^r$ times in a sequence of L chips.
3) The autocorrelation of the sequence $PN_i(t)$ and $PN_i(t+\tau)$ is very small except in the vicinity of =0.
4) The cross-correlation of any two sequences $PN_i(t)$ and $PN_j(t+\tau)$ is small.

Code Division Multiple Access

Code division multiple access is a direct sequence spread-spectrum system in which a number, at least two, of spread-spectrum signals communicate simultaneously, each operating over the same frequency band. In a CDMA system, each unit is given a distinct chip code. This chip code identifies the unit. For example, if a first unit has a first chip code, $g_1(t)$, and a second unit a second chip code, $g_2(t)$, etc., then a receiver, desiring to listen to the first unit, receives at the receiver's antenna all of the energy sent by all of the units. However, after despreading the first unit's signal, the receiver outputs all the energy of the first unit but only a small fraction of the energies sent by the second, third, etc., units.

CDMA is interference limited. That is, the number of units that can use the same spectrum and still have acceptable performance is determined by the total interference power that all of the units, taken as a whole, generate in the receiver. Unless one takes great care in power control, those CDMA transmitters which are close to the receiver cause the overwhelming interference. This effect is known as the near-far problem. In a mobile environment the near-far problem could be the dominant effect. Controlling the power of each individual mobile unit is possible so that the received power from each mobile unit is the same. This technique is called adaptive power control. See U.S. Pat. No. 5,093,840, issued Mar. 3, 1992, entitled, ADAPTIVE POWER CONTROL FOR A Spread-spectrum TRANSMITTER, by Donald L. Schilling, which is incorporated herein by reference.

It has been proposed to set aside 10% of the mobile-cellular bandwidth, or 1.00 MHz, to employ CDMA, for eliminating 10% of the currently existing mobile-cellular channels, i.e. approximately 5 channels, thereby restricting the use and access of present subscribers to the mobile-cellular system. Further, such a procedure disrupts current service as the base station of each cell must be modified.

As a result of this procedure, the existing units are penalized, since the number of available channels are reduced by 10% and a cellular company employing this approach must modify each cell by first eliminating those channels from use and then installing the new CDMA equipment.

The present invention is for a CDMA system which does not affect existing units in so far as it does not require that 10% of the band be set aside. Indeed, using this invention, an entirely separate CDMA system can be inserted into the existing mobile spectrum without affecting the existing operation of the frequency division multiple access (FDMA) mobile-cellular system or the forthcoming time division multiple access (TDMA) system.

The Proposed Spread-Spectrum CDMA System

The spread-spectrum communications system of the present invention is a broadband CDMA system. Spread-spectrum CDMA can significantly increase the number of units per cell, compared to TDMA. With CDMA, each unit in a cell uses the same frequency band. However, each spread-spectrum CDMA signal has a separate pseudo random code which enables a receiver to distinguish a desired signal from the remaining signals. Spread-spectrum units in adjacent cells use the same frequency band and the same bandwidth, and therefore interfere with one another. A received signal may appear somewhat noisier as the number of units' signals received by a spread-spectrum base station increases.

Each unwanted unit's signal generates some interfering power whose magnitude depends on the processing gain. Spread-spectrum units in adjacent cells increase the expected interfering energy compared to spread-spectrum units within a particular cell by about 50%, assuming that the spread-spectrum units are uniformly distributed throughout the adjacent cells. Since the interference increase factor is not severe, frequency reuse is not employed. Each spread-spectrum cell can use a full 10.0 MHz band for transmission and a full 10.0 MHz band for reception. Hence, using a chip rate of six million chips per second and a coding data rate of 4800 bps results in approximately a processing gain of 1250 chips per bit. It is well known to those skilled in the art that the number of spread-spectrum units is approximately equal to the processing gain. Thus, up to 1250 units can operate in the 10.0 MHz bandwidth of the mobile-cellular system.

The following shows that the B-CDMA spread-spectrum system, with a chip rate of 10 Mchips/sec and with the 3-CDMA spread-spectrum system occupying the full cellular band, can overlay on the existing AMPS system, and allows an additional 496 B-CDMA spread-spectrum units to the 50 AMPS mobile-cellular units located in the 10 MHz band. If TDMA were employed rather than AMPS, then 496 B-CDMA spread-spectrum units could equally overlay the 150 TDMA units. The calculations presented below assume that the AMPS system uses a three-sector antenna system. A six-sector system increases capacity. In addition, in the preferred embodiment, the B-CDMA spread-spectrum system uses a six-sector antenna system, as shown in FIG. 25, since using three-sectors decreases capacity.

Frequency Modulation

Consider the AMPS mobile-cellular unit receiving the desired FM signal plus interfering B-CDMA spread-spectrum signals. The input to the discriminator is therefore:

$$v_i(t) = \sqrt{2P_A}\cos(\omega_o t + \theta(t)) + \sum_{i=1}^{n}\sqrt{2P_C}\,c_i(t)\cos(\omega_o t + \phi_i) + n_w(t)$$

where $n_w(t)$ is thermal white gaussian noise. The FM receiver filters the interference, reducing its power by the processing gain, K, which is defined as the ratio of the spread-spectrum bandwidth to the FM bandwidth. Typically K=10 MHz/30 kHz=330. The filter output is $$v_f(t) = \sqrt{2P_A}\cos(\omega_o t + \theta(t)) + \sum_{i=1}^{n}\sqrt{2P_C/K}\,z_i(t)\cos(\omega_o t + \phi_i) + n(t)$$

where $z_i(t)$ is the chip stream $c_i(t)$ after filtering, where $\phi_i$ is the phase of each B-CDMA spread-spectrum interferer relative to the FM carrier, and where the noise $n(t)$ has been filtered.

Figure 14:
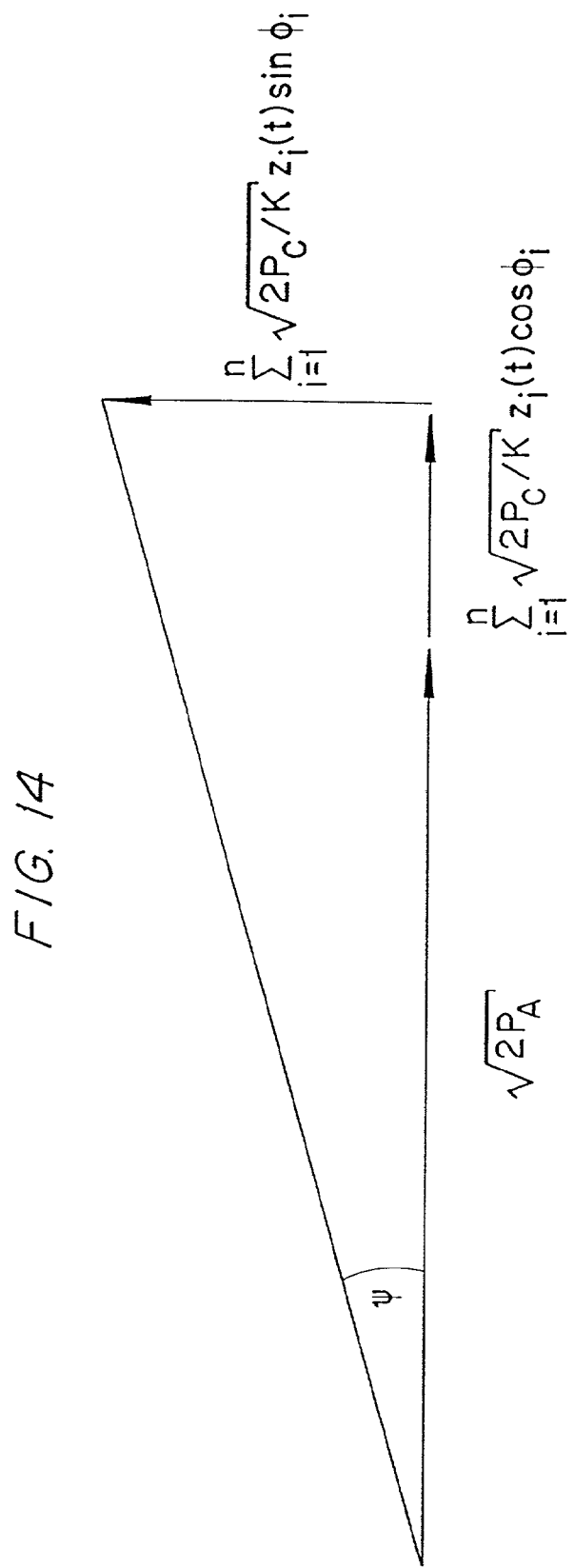
FIG. 14 illustrates a phasor diagram for the phase of a CDMA interferer.

S. O. Rice, TIME-SERIES ANALYSIS, Chap. 25, John Wiley & Sons, Inc., New York, 1963; as well as H. Taub and D. L. Schilling, PRINCIPLES OF COMMUNICATION SYSTEMS, 2nd Edition, McGraw-Hill, New York, 1986; point out that the modulation $\theta(t)$ has little effect on the calculation of the output noise power in an FM output SNR calculation. Setting $\theta(t)$ equal to zero for this calculation yields the phasor diagram shown in FIG. 14.

The output of an FM discriminator is the derivative of $\Psi$ with respect to time. Assuming a high input signal to noise ratio, C/I, i.e. assuming that:

$$P_A \gg nP_c/K$$

and $$\tan\psi = \psi$$

yields $$\frac{d\psi}{dt} = \sum_{i=1}^{n}\sqrt{\frac{P_C/P_A}{K}}\,z_i(t)\sin\phi_i.$$

To simplify the calculations, assume that the heavily filtered chip stream $z_i(t)$ approximates bandlimited, white, gaussian noise, with a variance equal to unity. Then, the output interfering power $N_I$, due to the $z_i$, in a bandwidth, $f_m$=30 kHz is, according to Taub and Schilling, supra., where B is the intermediate frequency (IF) bandwidth. Similarly, the output power $N_{TH}$ due to thermal noise is:

$$N_I = n\left(\frac{P_C/P_A}{2K}\right)\frac{4\pi^2}{3B}f_m^3 = n\left(\frac{P_C/P_A}{2K}\right)\frac{\omega_m^2}{3}f_m/B$$

$$N_{TH} = \frac{\eta}{P_A}\left(\frac{4\pi^2 f_m^3}{3}\right) = \frac{\eta f_m}{P_A}\left(\frac{\omega_m^2}{3}\right).$$

Assuming sine wave modulation, the output signal power is, according to Rice, supra., $$S_o = (\beta\omega_m)^2/2$$

Hence the output signal-to-noise-ratio is $$SNR_o = \frac{S_o}{N_I + N_{TH}} = \frac{\beta^2\omega_m^2/2}{n\left(\frac{P_C/P_A}{2K}\right)\omega_m^2\frac{f_m}{3B} + \frac{\eta f_m}{P_A}\left(\frac{\omega_m^2}{3}\right)}$$

$$= \frac{3}{2}\beta^2(P_A/\eta f_m)\bigg/\left[1 + \frac{n}{2K}\left(\frac{P_C}{P_A}\right)\left(\frac{P_A}{n f_m}\right)\right]$$

or $$SNR_o = \frac{3}{2}\beta^2(CNR)\left(\frac{B}{f_m}\right)\bigg/\left[1 + \frac{n}{2K}\left(\frac{P_C}{P_A}\right)(CNR)\right]$$

where the average carrier to thermal noise ratio (CNR) equals ($P_A/\eta B$). For example, in the AMPS/B-CDMA spread-spectrum overlay of the present invention, $\beta$=4, $B/f_m$=10, K=330 and $P_A/P_C$=10. Then if, for example, n=144, $$SNR_o = 240(CNR)/[1 + 0.22(0.1)CNR]$$

$$= 240\left(\frac{CNR}{P_n}\right)\bigg/[1 + 0.22(CNR)].$$

FIG. 15 plots $SNR_o$ for different numbers of spread-spectrum units, n, in an AMPS antenna sector. FIG. 15 may also be used to estimate performance in a fading medium. For example, if the number of simultaneous B-CDMA spread-spectrum units in an AMPS sector is 144 and if the average carrier to thermal noise ratio, CNR, seen by the AMPS mobile-cellular system is 19 dB, then the demodulated output $SNR_o$ of the AMPS FM demodulator is 43 dB. A 6 dB fade reduces the CNR to 13 dB and reduce the demodulated output $SNR_o$ to 37 dB. The above equation for $SNR_0$ may be used to determine the maximum number of CDMA spread-spectrum units allowable.

Consider a CDMA spread-spectrum communications system receiving a desired spread-spectrum signal in the presence of interference. Since CDMA spread-spectrum communication systems are limited by interference, rather than limited by thermal noise, the thermal noise may be neglected. As shown in FIG. 6, the spread-spectrum demodulator 161, in the preferred embodiment, may include as a coherent demodulator 400, as illustrated in FIG. 16, for DS/BPSK CDMA in the presence of CDMA and FM interference from an AMPS mobile-cellular system. As shown in FIG. 16, the coherent demodulator 400 includes a mixer 402 and an integrator 404. The coherent demodulator 400 is employed to perform the demodulation procedure. In FIG. 16, the phases $\theta_i$ and $\theta_j$ are independent random variables uniformly distributed between $-\tau$ and $\tau$, each representing the effect of random propagation delays. The spreading codes, i.e. chip sequences, are $c_i(t-\tau_i)$ where $\tau_i=0$ if the chip edges line up. Assume the chip edges occur displaced from that of unit $U_o$ by the time $\tau_i$. If one uses a large spreading sequence, each bit appears as though the bit were spread by a truly random binary sequence and thus $\tau_i$ can be assumed to be uniformly distributed between 0 and $T_c$, where $T_c$ is the chip duration.

The ratio $T_b/T_c$, which is the ratio of a data bit to a chip, is called the processing gain. Note that this processing gain is different from the processing gain, K, i.e. the ratio of the spread-spectrum bandwidth to the FM bandwidth. The phase $\phi_{mj}$ represents the FM modulation. In the AMPS mobile cellular system the maximum value of is $\phi_{mj}$ approximately equal to 4.

Referring to FIG. 16, one obtains $$v_o = \sqrt{2P_c}\,T_b d_o + \sqrt{2P_c}\,T_b \sum_{i=1}^{n_1} \cos\theta_i \frac{1}{T_b}\int_0^T c_o(t)c_i(t-\tau_i)dt +$$

$$\sqrt{2P_A}\,T_b \sum_{j=1}^{n_2} \frac{1}{T_b}\int_0^T bc_o(t)\cos(\phi mj(t) + \phi j)dt$$

where $$c'_i(t-\tau_i) = d_i(t-\tau_i)c_i(t-\tau_i)$$

since the $c_i$'s are assumed random.

For determining the output SNR of the CDMA spread-spectrum communication system, one considers separately the interfering power produced by each type of interfering signal.

Interference Caused By Other Spread-Spectrum Units

The interference caused by the ni CDMA spread-spectrum interferers is $$I_1 = \sqrt{2P_c} \sum_{i=1}^{n_1} \cos\theta_i \int_0^T bc_o(t)c_i(t-\tau_i)dt$$

The power in $I_1$, i.e. $I_1^2$, is $$I_1^2 = \frac{1}{2}(2P_c)\left[\sum_{i=1}^{n_1}\int_0^T bc_o(t)c_i(t-\tau_i)dt\right]^2$$

which uses the fact that $$\overline{\cos^2\theta_i} = \frac{1}{2}.$$

M. B. Pursley, "Performance Evaluation For Phase-Coded Spread-Spectrum Multiple-Access Communication—Part I: System Analysis," IEEE TRANSACTIONS ON COMMUNICATIONS, COM-25, No. 8 August, 1977; and others have shown that the power due to the chips not being in alignment is less than the power obtained when $\tau_i=0$, for all i. Indeed the expression usually used is $$\overline{\left[\sum_{i=1}^{n_1}\int_o^{T_b} c_o(t)c'_i(t-\tau_i)dt\right]^2} = \frac{2}{3}n_1.$$

The value (⅔) $n_1$ obtained above is dependent on the pulse shape and varies for the cases considered: ⅔ (rectangular), ¾ (half-sine wave) and 0.8 (raised-cosine). While the derivation of this result is, in general, complicated, the following three simple examples illustrate of the derivation.

Rectangular Pulses

Consider the rectangular pulses c.sub.o and c'.sub.i illustrated in FIG. 17. Note that the product $c_o(t)\,c'_i(t-\tau_i)$ is $$c_o(t)c'_i(t-\tau_i) = \begin{cases} \pm 1 & 0 \le t \le \tau_i;\ \text{each with}\ P = \frac{1}{2} \\ \pm 1 & \tau_i \le t < T_c,\ \text{each with}\ P = \frac{1}{2}. \end{cases}$$

Therefore $$\int_0^{T_c} c_o(t)c'_i(t-\tau_i)dt = \begin{cases} \pm T_c & \text{each with}\ P = \frac{1}{2} \\ \pm(T_c - \tau_i) & \text{each with}\ P = \frac{1}{2} \end{cases}$$

and so $$\overline{\left|\int_0^{T_c} c_o(t)c'_i(t-\tau_i)dt\right|^2} = \frac{1}{2}(T_c)^2 + \frac{1}{2}(T_c-\tau_i)^2 = \frac{2}{3}T_c^2$$

if one assumes that $\tau_i$ was uniformly distributed between 0 and $T_c$. Note that if $\tau_i=0$, $$\int_0^{T_c} c_o(t)c'_i(t)dt = \pm T_c\ \text{each with}\ P = \frac{1}{2}$$

and $$\overline{\left[\int_0^{T_c} c_o(t)c'_i(t)dt\right]^2} = T_c^2.$$

Ergo, comparing the above equations yields a factor of ⅔.

Half-Sinusoidal Input Pulses

A second example assumes $c'_i(t)=\sin[\pi t/(Tc)]$, and, for simplicity of calculation, $c_o(t)$ is taken to be rectangular as illustrated in FIG. 18. In this example, $$\int_0^{T_c} c_o(t)c_i(t-\tau_i)dt = \pm \frac{T_c}{\pi}\Big[1 - \cos\frac{\pi\tau_i}{T_c}\Big] \pm \frac{T_c}{\pi}\Big[\cos\frac{\pi T_i}{T_c} - 1\Big].$$

The average power is then $$\overline{\Big[\int_0^{T_c} c_o(t)c_i(t-\tau_i)dt\Big]^2} = \frac{1}{T_c}\int_0^{T_c}\Big[\frac{1}{2}\Big(\frac{2T_c}{\pi}\Big)^2 + \frac{1}{2}\Big(\frac{2T_c}{\pi}\Big)^2\cos^2\frac{\pi\tau_i}{T_c}\Big]d\tau_i$$

$$= \frac{3}{4}\Big(\frac{2T_c}{\pi}\Big)^2.$$

If $\tau_i=0$, then it is readily shown that $$\overline{\Big[\int_0^{T_c} c_o(t)c_i'(t_i)dt\Big]^2} = \Big(\frac{2T_c}{\pi}\Big)^2.$$

Note the factor now becomes ¾ rather than ⅔.

The Raised-Cosine

If $c'_i(t)=1-\cos[2\pi t/(T_c)]$, i.e. a raised cosine, $0.8T_c^2$ results compared to $T_c^2$ if $\tau_i=0$, and the factor is now 0.8. For rectangular shape pulses, the equation for the power in $I_j$ becomes $$\overline{I_j^2} = \frac{T_b^2 n_1}{3}(2P_c)\frac{f_b}{f_c}$$

where the denominator of 3 is derived by well known techniques in the prior art, as well as by alternative derivations of the error rate in CDMA spread-spectrum system; for example, by J. M. Holtzman, "A Simple, Accurate Method To Calculate Spread-Spectrum Multiple-Access Error Probabilities," IEEE TRANSACTIONS ON COMMUNICATIONS, vol. 40, No. 3, March 1992.

Interference Caused By the FM Units

The interference caused by the n2 FM AMPS mobile-cellular units is $$I_2 = \sqrt{2P_A}\, T_b \sum_{j=1}^{n_2} \frac{1}{T_b}\int_0^{T_b} c_o(t)\cos(\phi_{mj}(t)+\phi_j)dt.$$

To simplify the discussion one approximates $I_2$ by the summation $$I_2 = \sqrt{2P_A}\, T_c \sum_{j=1}^{n_2}\sum_{i=1}^{T_b/T_c} C_o(iT_c)\cos[\phi_{mj}(iT_c)+\phi_j].$$

Then the variance of $I_2$ becomes $$\overline{I_2^2} = (2P_A)T_c^2 \sum_{j=1}^{n_2}\sum_{i=1}^{T_b/T_c} E\{\cos^2[\phi_{mj}(iT_c)+\phi_j]\}.$$

Hence $$\overline{I_2^2} = T_b^2 n_2 (P_A) f_b/f_c.$$

Signal To-Noise Ratio

From the equations for $V_o$ and the power in $I_1$ and $I_2$ the SNR seen by a B-CDMA spread-spectrum unit in the presence of other B-CDMA spread-spectrum units and AMPS units becomes:

$$SNR = \frac{2P_C T_b^2}{2P_C T_b^2\Big(\frac{n_1}{3}\cdot\frac{f_b}{f_c}\Big) + 2P_A T_b^2\Big(\frac{n_2}{2}\cdot\frac{f_b}{f_c}\Big)}$$

$$= \frac{f_c/f_b}{\frac{n_1}{3}+\frac{n_2}{2}\Big(\frac{P_A}{P_C}\Big)}.$$

The Cellular Overlay

Using the equations for the power in $I_2$, the operation of the cellular overlay is indicated by the effect of AMPS units on the spread-spectrum base station, as shown in FIG. 19. Assuming that the spread-spectrum base station employs sector means with a 60 degree, or six sector, antenna, the number of interfering AMPS units is $n_2=1.6(50/6)=13.$ where 50 is the number of AMPS mobile cellular units in a cell, six is the fraction of units in the sector and the factor 1.6 includes adjacent cell interference.

The processing gain $f_c/f_b$=10 Mchips/13 (kbits/sec) or $$\frac{f_c}{f_b} = \frac{10\text{ Mchips/s}}{13\text{ kbits/s}} = 770.$$

Let the ratio of the powers transmitted by the mobile-cellular units and B-CDMA spread-spectrum units be $P_A/P_C$=15, where $P_A/P_C$ is the ratio of the power received at a base station due to an AMPS unit to the power received at the base station due to a CDMA spread-spectrum unit. Then the power in $I_2$ becomes:

$$SNR = \frac{770}{\frac{n_1}{3}+\frac{13}{2}(15)}.$$

If the SNR at the receiver is 4 dB, or 6 dB, which is sufficient to yield an error rate of $10^{-3}$, since the adaptive delta modulator (ADM) performs properly with a BER=$10^{-2}$, then $n_1$=285, neglecting VAD.

If approximately 60% of the interfering units are in the adjacent sectors of the neighboring two cells and since there are six sectors, more than (285/1.6)×6=1069 CDMA spread-spectrum units can simultaneously access the CDMA spread-spectrum base station neglecting VAD and 2137 CDMA spread-spectrum units with VAD.

Unit interference to the base station does not limit performance by the effect of B-CDMA spread-spectrum units on the AMPS mobile-cellular base station, as shown in FIG. 20. Assuming that the AMPS mobile-cellular base station uses a three-sector antenna, the equation for $SNR_o$ yields the FM demodulated output SNR:

$$(SNR)_o = \frac{3}{2}\beta^2(CNR)\left(\frac{B}{f_m}\right) \bigg/ \left\{1 + \frac{n_1}{2K}\left(\frac{P_C}{P_A}\right)(CNR)\right\}.$$

where CNR is the carrier power-to-thermal noise ratio.

Let $\beta=4$, $B/f_m=10$, $K=330$, $P_A/P_C=10$ and CNR=50=17 dB. If the system is designed so that the CDMA interference is equal to the thermal noise power, then or 198 units neglecting VAD.

$$n_1 = 2K(P_A/P_C)/CNR = 2(330)(15)/50 = 198$$

Again, assuming that 60% of the interference comes from units in adjacent cells and including VAD, the number of B-CDMA spread-spectrum units in the cell, from all three sectors, is $$N_{CDMA} = \frac{198}{1.6} \times \underset{VAD}{2} \times \underset{Sectors}{3} = 742.$$

Other values for different C/N ratios are readily obtained from FIG. 15.

Also, the effect of the B-CDMA spread-spectrum-base station and the AMPS mobile-cellular base stations on CDMA spread-spectrum units, as shown in FIGS. 21 and 22, respectively. The SNR seen by a CDMA spread-spectrum unit is given by the equation for the power in $I_2$. However, in the worst case, a CDMA spread-spectrum unit is in the corner of three cells and the power reaching the worst case CDMA spread-spectrum unit from the 3-AMPS base mobile-cellular stations is $n_2 P_A$ where $$n_2 = \underset{\substack{\uparrow \\ 3 \text{ sectors}}}{(50/3)} \quad \underset{\substack{\uparrow \\ 3 \text{ base stations}}}{(3)} = 50.$$

The power received by the worst-case CDMA spread-spectrum unit from each of the three spread-spectrum base stations is $n_1 \overline{P}$, where $\overline{P}$ is the average power received by a B-CDMA spread-spectrum unit. Each CDMA spread-spectrum base station transmits a power of $P_1 = 0.77 \overline{P}$ Watts/unit to two thirds of its spread-spectrum units near the spread-spectrums base station and the power $1.44 \overline{P}$ to the one-third of its units that are far from the spread-spectrum base station. This constitutes a coarse forward power control. Let us also set $P_A/\overline{P}=9.4$ in the forward direction. Using the equation for the power in $I_2$ for this worst case condition yields:

$$SNR = \frac{1.44 \times 770}{\frac{n_1}{3} + \frac{50}{2}(9.4)}.$$

For a SNR of 6 dB, or BER=$10^{-3}$, one determines $n_1=127$ units neglecting VAD. By including VAD, by including the fact that the interference is caused by three cells, and by including there are six sectors in a cell, the maximum number of spread-spectrum units is:

$$N_1 = 6(\text{sectors}) \cdot 2(\text{VAD})n_1/3(\text{cells}) = 4n_1 = 506.$$

Referring to FIGS. 21 and 22, it is readily shown that for the units in the ⅔ area closest to the base station, the SNR is $$SNR = \frac{0.77 \times 770}{\frac{n_1}{3} + \frac{50 \times 1.6/3}{2}(9.4)}.$$

Note the 50×1.6/3 in the denominator of the above equation represents that the AMPS mobile-cellular base station in the cell is contributing interference to spread-spectrum units near the spread-spectrum base station and 60% additional interference is coming from base stations in neighboring cells. Solving the equation for the SNR yields $n_1 = 71.7$.

Since the B-CDMA interference comes from the CDMA spread-spectrum base station in the cell and also an additional 60% comes from adjacent base stations, $$N_1 = 6(\text{sectors}) \cdot 2(\text{VAD})n_1/1.6 = 7.5n_1 = 538$$

where the factor 1.6 includes adjacent cell interference.

Also, the effect of the CDMA spread-spectrum base stations on AMPS mobile-cellular units is shown in FIG. 23. The SNR seen by the AMPS mobile-cellular units is obtained from the equation from the equation for $SNR_o$ above, resulting in:

$$(SNR)_o = \frac{3}{2}\beta^2(CNR)\left(\frac{B}{f_m}\right) \bigg/ \left(1 + \frac{n_1}{2K}\left(\frac{\overline{P}}{P_A}\right)(CNR)\right).$$

Then, with $P_A/\overline{P}=9.4$ and K=330 and CNR=50=17 dB, the value of $N_1$ such that the CDMA interference is equal to the AMPS interference is $$n_1 = 2K \bigg/ \left(\frac{\overline{P}}{P_A}\right)(CNR) = \frac{660(9.4)}{(50)} = 124$$

or 124 units in the three sectors without VAD.

The maximum number of CDMA spread-spectrum units in the cell is then $$N_1 = 124 \cdot \frac{1}{3} \cdot 6(\text{sectors}) \cdot 2(VAD) = 496$$

or 496 units, where the factor of ⅓ takes into account three base stations.

The results of these calculations indicate that the limitation on the number of units is the interference produced by the B-CDMA spread-spectrum base stations to a worst-case AMPS mobile-cellular unit located in the corner of three cells. Even with this limitation, 496 B-CDMA spread-spectrum units can overlay on top of 50 AMPS mobile-cellular units. Thus the combined total number of units in the 10 MHz band become 496+50=578 units. This result is approximately eleven times the original number of AMPS mobile-cellular units using the spectrum.

Note that exactly the same calculations hold for TDMA. In the TDMA case, however, the total number of units is 496+150=646 which is a factor 4.3 times greater then the original number of TDMA units.

Consider the effect of the spread-spectrum-base station on a cellular unit. The power of the spread-spectrum signal from the spread-spectrum-base station is spread over 10.0 MHz. The cellular unit, however, communicates on a predetermined channel using FM, which has a bandwidth of approximately 30 kHz. Thus, the cellular unit has an effective processing gain with respect to the spread-spectrum signal from the spread-spectrum-base station of approximately 330, or 25 dB. The 25 dB means that the power level of the spread-spectrum signal from the spread-spectrum-base station is reduced at the cellular unit by 330. Assuming that the spread-spectrum-base station and cellular-base station each have a transmitter power level of 10 Watts, the processing gain yields an acceptable signal-to-interference ratio at the cellular unit, i.e. much higher then the required 17 dB.

The effect of the cellular-base station from the spread-spectrum-base station as follows: The spread-spectrum signal from the spread-spectrum-base station is spread by the chip rate of 6.25 megachips per second. The data rate of the data in the spread-spectrum signal is 4,800 bits per second. Thus, the processing gain at the spread-spectrum unit is 6.25 megachips per second divided by 4,800 bits per second, which approximately equals 1,250, or approximately 31 dB. Assuming the spread-spectrum-base station and the cellular-base station each have a transmitter power of 10 Watts, this processing gain yields an acceptable signal-to-interference ratio at the spread-spectrum unit, i.e. 31 dB.

Consider the effect of spread-spectrum units on the receiver at the cellular-base station. Assume, for ease of calculations, that units of the mobile-cellular system and units of the spread-spectrum system employ adaptive power control. The cellular unit transmits a power, $P_{CELL}$=0.5 W, and the spread-spectrum unit transmits a power $P_{ss}$=10 mW. Each cell of a mobile-cellular system is assumed to have 50 cellular units, and the spread-spectrum system is assumed to have K units. The interference to the receiver of the cellular-base station is N times $P_{ss}$ divided by the processing gain. As shown before the processing gain is N=10.0 MHz/30 kHz=330 or 25 dB. Thus, the signal-to-interference ratio is $$NP_{CELL}/(K \times P_{SS})=330(\frac{1}{2})/K(2.01)=2 \times 10_4/K.$$

Assuming 200 spread-spectrum units (K=200), yields a signal-to-interference ratio of 20 dB, which exceeds the 17 dB signal to interfere ratio required for the FDMA used today and greatly exceeds the 7 dB signal-to-interference ratio needed in the projected TDMA system. The presently deployed mobile-cellular system typically has $P_{CELL}$=500 mW for hand held telephones and $P_{CELL}$ equals one Watt for automobile located telephones. Thus, the foregoing analysis requires that the spread-spectrum unit transmits a power level of ten mW, $P_{ss}$=10 mW.

Consider the effect of the foregoing power levels on the spread-spectrum-base station. The spread-spectrum-base station receives an interfering power level from 50 cellular units, of 50 times one Watt. With a processing gain for the spread-spectrum system of N=1250, a signal-to-interference ratio results at the spread-spectrum-base station of S/I=(10 mW×1250)/(1 W×50), yielding S/I=¼ which is −6 dB. The receiver at the spread-spectrum-base station requires a signal to noise ratio of 4 dB. The required SNR can be realized at the spread-spectrum-base station with a band reject filter for notching out the signals from the cellular units in the 30 kHz predetermined channels. With a properly designed comb-notch filter, a 20 dB to 30 dB signal-to-interference ratio can readily be achieved.

FIG. 24 illustrates a comb-notch filter 333 inserted in a receiver of a spread-spectrum-base station. The receiver includes a low noise amplifier 331 coupled between the antenna 330 and a down converter 332. The comb-notch filter 333 is coupled between the down converter 332 and base-spread-spectrum demodulator 334. A base-demodulator 335 is coupled to the base-spread-spectrum detector 334. In the preferred embodiment, the base-demodulator 334 may include a coherent demodulator 400, as illustrated in FIG. 16, for DS/BPSK CDMA in the presence of CDMA and FM interference from an AMPS system. As shown in FIG. 16, the coherent demodulator 400 includes a mixer 402 and an integrator 404. The coherent demodulator 400 is employed to perform the demodulation procedure. The comb-notch filter 333 in this illustrative example operates at an intermediate frequency and removes interference from the mobile-cellular system.

Figure 1:
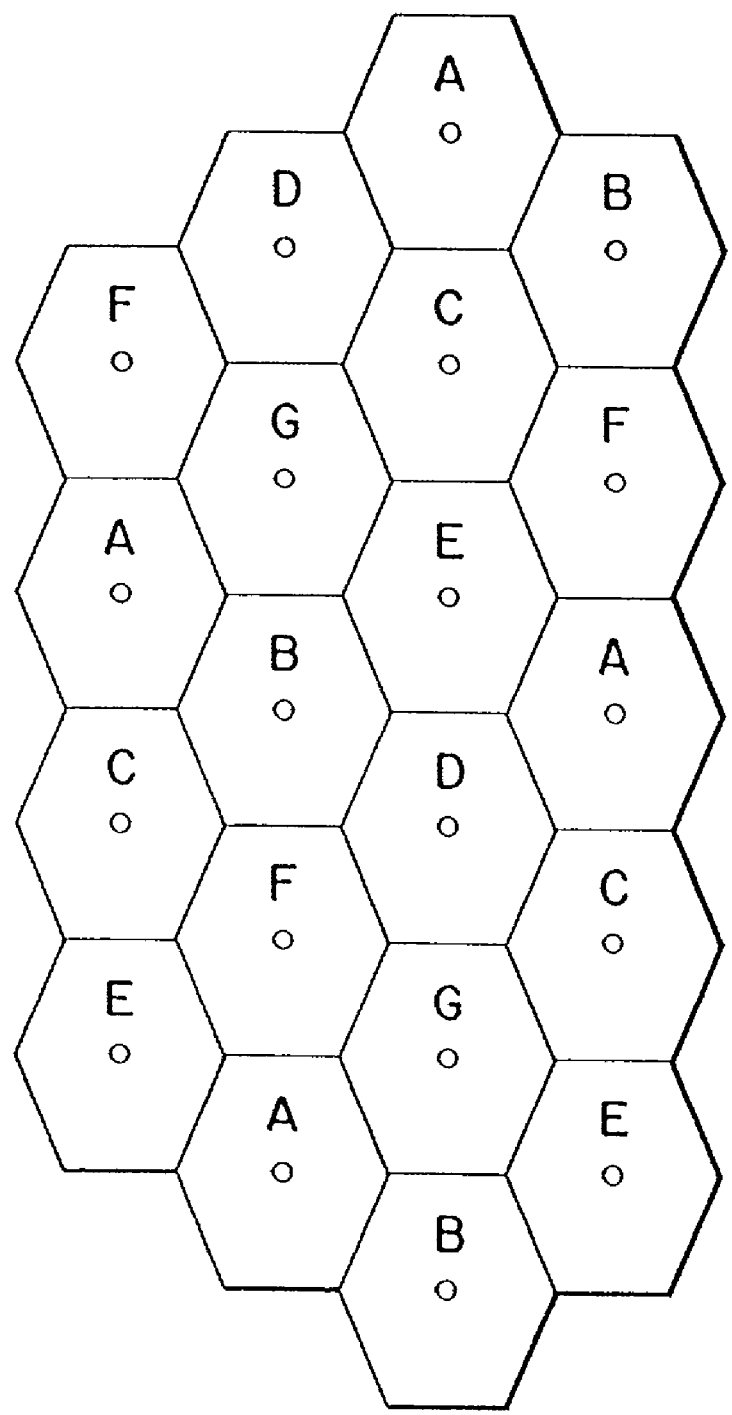
FIG. 1 illustrates a seven-frequency-set mobile-cellular plan.
Figure 2:
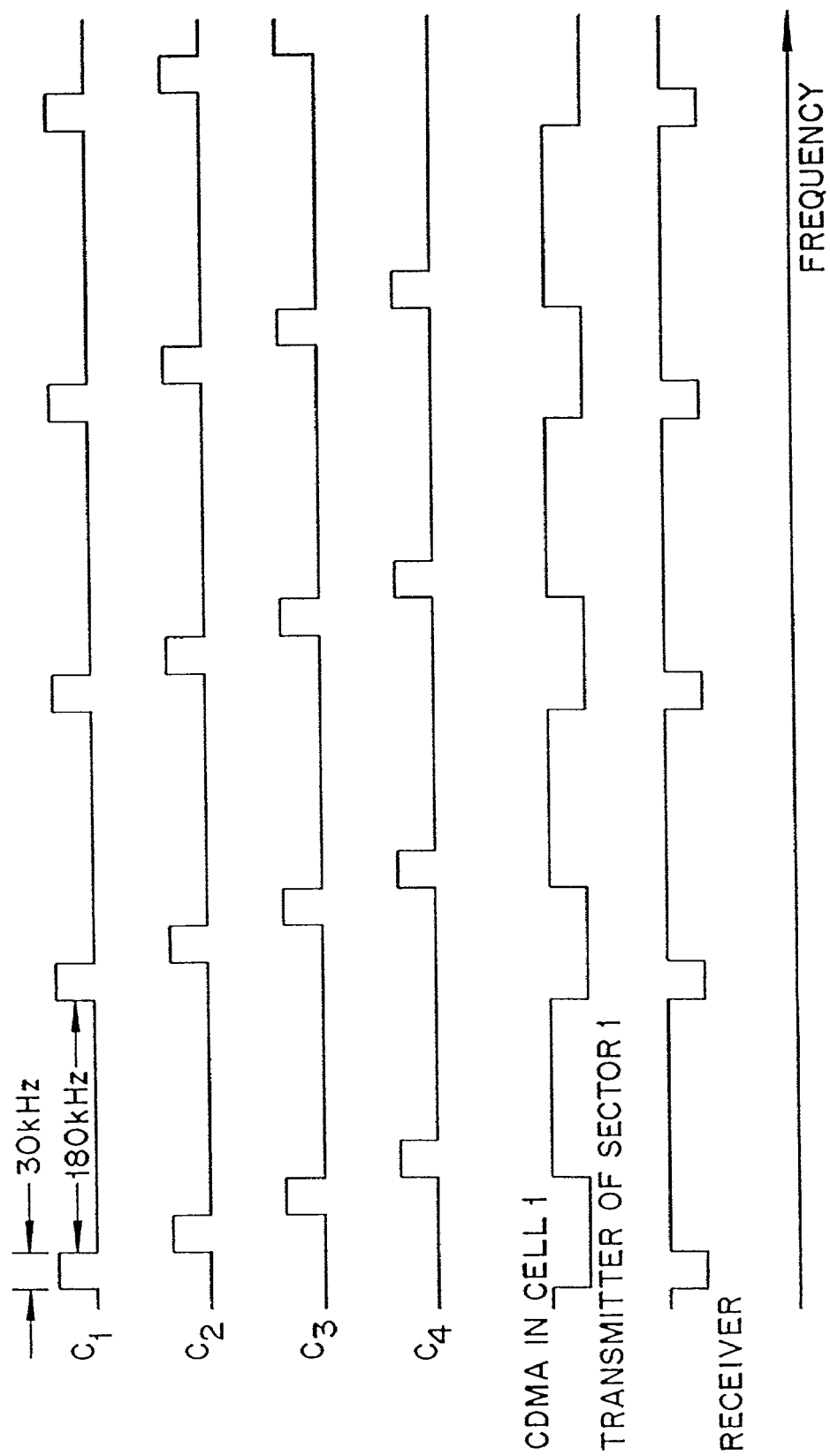
FIG. 2 shows cellular channels which are separated by a guard band of 180 kHz.

In the preferred embodiment, the present invention generates a 10 MHz wide spread-spectrum signal, and employs a six segment antenna, as shown in FIG. 25. In each segment, the power transmitted at the frequencies used for transmission by the three intersecting cells will be notched out, as shown in FIG. 2. As illustratively shown in FIG. 26, the power transmitted in Cell 1, Cell 2, and Cell 3 is removed from the shaded region. In addition, the spread-spectrum-base station receiver notches out each 30 kHz channel used by the cellular users in Cell 1, for example, as illustrated in FIG. 2. Since, in the shaded region of FIG. 26, the B-CDMA spread-spectrum base stations in cell one, cell two, and cell three do not transmit in the frequency bands used by the cellular user shown, for example, in the shaded region of FIG. 26, the cellular user receives no interference.

From the foregoing analysis, a person of skill in the art recognizes that the present invention allows a spread-spectrum CDMA system to overlay on a pre-existing FDMA mobile-cellular system, without modification to the pre-existing mobile-cellular system. The present invention allows frequency reuse of the already allocated frequency spectrum to the mobile-cellular system. At the same time performance of the mobile-cellular system is not degraded. The spread-spectrum system may add an increase of 200 spread-spectrum units over the 50 cellular units. The present system performance calculations are considered conservative, and an increase in spread-spectrum units may be greater than the estimated 200.

It will be apparent to those skilled in the art that various modifications can be made to the spread-spectrum CDMA communications system of the instant invention without departing from the scope or spirit of the invention, and it is intended that the present invention cover modifications and variations of the spread-spectrum CDMA communications system provided they come in the scope of the appended claims and their equivalents.

What is claimed is:

1. A method for non-interferingly transmitting spread spectrum signals in a wireless communication system, the wireless system having spread spectrum and narrow band uses, the method comprising:
   from a selected base station, producing a spread spectrum signal for transmission in a selected sector of the base station;

notch filtering the produced spread spectrum signal at frequencies used by narrow band users located in the selected sector and sectors of base stations other than the selected base station being adjacent to the selected sector; and transmitting the notch filtered signal in the selected sector.

2. The method of claim 1 further comprising:

the selected base station transmitting a signal to a narrow band used in the selected sector using a frequency of the notched filtered frequencies of the produced spread spectrum signal.

3. The method of claim 1 wherein the notch filtering is performed by a comb notch filter.

4. The method of claim 3 wherein a controller controls frequencies notched by the comb notch filter.

5. The method of claim 1 wherein the narrow band users are users of a time division multiple access system.

6. The method of claim 1 wherein the narrow band users are users of a microwave system.

* * * * *

UNITED STATES PATENT AND TRADEMARK OFFICE
CERTIFICATE OF CORRECTION

PATENT NO. : 7,020,125 B2
APPLICATION NO. : 09/878586
DATED : March 28, 2006
INVENTOR(S) : Donald L. Schilling It is certified that error appears in the above-identified patent and that said Letters Patent is hereby corrected as shown below:

ON THE TITLE PAGE

At section (56), U.S. PATENT DOCUMENTS, page 2, left column, line 37, delete "4,894,842 A 1/1990 Broekhoven" and insert therefor --4,894,842 A 1/1990 Broekhoven et al.--.

IN THE ABSTRACT

At section (57), ABSTRACT, page 1, right column, line 4, after the word "signal" delete "notche" and insert therefore --notches--.

At section (57), ABSTRACT, page 1, right column, line 7, after the word "adjacent", delete "tot he" and insert therefor --to the--.

IN THE SPECIFICATION

At column 1, lines 4 & 5, delete "BROADBAND CDMA OVERLAY SYSTEM AND METHOD".

At column 2, line 30, before the word "selected", delete "tot he" and insert therefor --to the--.

At column 3, line 57, after the word "user", delete "uses" and insert therefor --using--.

At column 3, line 58, after the word "user", delete "uses" and insert therefor --using--.

At column 8, line 56, after the word "receiver", delete "is".

At column 12, line 62, after the words "dB and", delete "reduce" and insert therefor --reduces--.

At column 13, line 13, after the word "between", delete "-$\tau$ and $\tau$," and insert therefor -- -$\pi$ and $\pi$,--.

At column 13, line 27, after the words "value of", delete "is $\phi_m$" and insert therefor --$\phi_m$ is--.

UNITED STATES PATENT AND TRADEMARK OFFICE
CERTIFICATE OF CORRECTION

PATENT NO. : 7,020,125 B2
APPLICATION NO. : 09/878586
DATED : March 28, 2006
INVENTOR(S) : Donald L. Schilling It is certified that error appears in the above-identified patent and that said Letters Patent is hereby corrected as shown below:

At column 13, line 33, delete equation and insert therefor $$-- v_0 = \sqrt{2P_c}T_b d_0 + \sqrt{2P_c}T_b \sum_{i=1}^{n_i} \cos\Theta_i \frac{1}{T_b} \int_0^{T_b} c_o(t)c_i(t-\tau_i)dt + \sqrt{2P_A}T_b \sum_{j=1}^{n_j} \frac{1}{T_b} \int_0^{T_b} c_o(t)\cos\phi_{mj}(t) + \phi_j)dt \quad --$$

At column, 13, line 54, delete equation and insert therefor $$-- I_1\sqrt{2P_c} \sum_{i=1}^{n_i} \cos\Theta_i \int_0^{T_b} c_o(t)c_i(t-\tau_i)dt \quad --$$

At column 13, line 61, delete equation and insert therefor $$-- I^2_1 = \tfrac{1}{2}(2P_c)\left[\sum_{i=1}^{n_i} \int_0^{T_b} c_o(t)c_i(t-\tau_i)dt\right]^2 \quad --$$

At column 14, line 20, after the word "illustrate", delete "of".

At column 14, line 38, of equation, delete " $\int_{0^c}^{T}$ " and insert therefor -- $\int_0^{T_c}$ --.

At column 14, line 65, after the word "assumes", delete "c'$_i$(t)=sin [τt/(Tc)]" and insert therefor --c'$_i$(t)=sin [πt/(Tc)]--.

At column 15, line 3, of equation, delete element " $\frac{\pi T_i}{T_c}$ " and insert therefor -- $\frac{\pi \tau_i}{T_c}$ --.

At column 15, line 20, of equation, delete element "(t$_i$) and insert therefor --(t)--.

At column 15, line 25, after the word "If", delete "c'$_i$(t) = 1-cos[2τt/(T$_c$)]" and insert therefor -- c'$_i$(t) = 1-cos[2πt/(T$_c$)]--.

At column 15, line 27, after the words "power in", delete "I$_j$" and insert therefor --I$_i$--.

UNITED STATES PATENT AND TRADEMARK OFFICE
CERTIFICATE OF CORRECTION

| | | |
|---|---|---|
| PATENT NO. | : 7,020,125 B2 | Page 3 of 4 |
| APPLICATION NO. | : 09/878586 | |
| DATED | : March 28, 2006 | |
| INVENTOR(S) | : Donald L. Schilling | |

It is certified that error appears in the above-identified patent and that said Letters Patent is hereby corrected as shown below:

At column 16, lines 56 & 57, after the words "with a", delete "BER=$10^-{}_2$" and insert therefor --BER=$10^{-2}$--.

At column 17, line 52, before the word "base", delete "spectrums" and insert therefor --spectrum's--.

At column 17, line 65, after the word "For", delete "a" and insert therefor --an--.

At column 18, line 31, after the first use of the word "equation", delete "from the equation".

At column 18, line 67, after the word "band", delete "become" and insert therefor -- becomes--.

At column 19, line 5, after the word "greater", delete "then" and insert therefor --than--.

At column 19, line 21, after the word "higher", delete "then" and insert therefor --than--.

At column 19, line 24, after the word "station", insert --is--.

At column 19, line 52, before the word "ratio", delete "interfere" and insert therefor --interference--.

At column 20, line 7, after the word "filter", delete "333" and insert therefor --333--.

UNITED STATES PATENT AND TRADEMARK OFFICE
CERTIFICATE OF CORRECTION

PATENT NO. : 7,020,125 B2
APPLICATION NO. : 09/878586
DATED : March 28, 2006
INVENTOR(S) : Donald L. Schilling It is certified that error appears in the above-identified patent and that said Letters Patent is hereby corrected as shown below:

IN THE CLAIMS

At claim 2, column 21, line 9, after the word "band" delete "used" and insert therefor --user--.

Signed and Sealed this

Twenty-sixth Day of December, 2006

JON W. DUDAS
*Director of the United States Patent and Trademark Office*